(12) United States Patent
Pervan

(10) Patent No.: US 7,845,140 B2
(45) Date of Patent: *Dec. 7, 2010

(54) FLOORING AND METHOD FOR INSTALLATION AND MANUFACTURING THEREOF

(75) Inventor: Darko Pervan, Viken (SE)

(73) Assignee: Valinge Innovation AB, Viken (SE)

( * ) Notice: Subject to any disclaimer, the term of this patent is extended or adjusted under 35 U.S.C. 154(b) by 867 days.

This patent is subject to a terminal disclaimer.

(21) Appl. No.: 10/808,455

(22) Filed: Mar. 25, 2004

(65) Prior Publication Data

US 2004/0177584 A1    Sep. 16, 2004

Related U.S. Application Data

(63) Continuation-in-part of application No. PCT/SE2004/000327, filed on Mar. 8, 2004.

(60) Provisional application No. 60/456,956, filed on Mar. 25, 2003.

(30) Foreign Application Priority Data

Mar. 6, 2003 (SE) ................................. 0300626
Oct. 29, 2003 (SE) ................................. 0302865

(51) Int. Cl.
*E04B 1/00* (2006.01)

(52) U.S. Cl. .................. 52/747.1; 52/586.1; 52/588.1; 52/589.1; 403/345; 403/375; 404/46; 404/47; 428/44; 428/57

(58) Field of Classification Search ................. 52/591.1, 52/592.4, 592.2, 589.1, 592.1, 578, 581, 52/390, 391, 392, 574, 588.1, 533, 534, 539, 52/553, 582.1, 586.1, 586.2, 590.2, 590.3, 52/591.2, 591.3, 591.4, 591.5, 582.2, 582.5, 52/745.08, 745.19, 747.1, 747.11, 748.1, 52/748.11; 403/334, 356, 364–368, 372, 403/375, 376, 381; 404/34, 35, 40, 41, 46, 404/47, 48–58, 68, 70; 428/44, 47–50, 57, 428/58, 60, 62, 106, 192–194
See application file for complete search history.

(56) References Cited

U.S. PATENT DOCUMENTS 168,672 A    10/1875   Reed
213,740 A     4/1879   Conner (Continued)

FOREIGN PATENT DOCUMENTS

AT         218725 B     12/1961

(Continued)

OTHER PUBLICATIONS

Webster's Dictionary, Random House: New York (1987), p. 862.

(Continued)

*Primary Examiner*—Richard E Chilcot, Jr.
*Assistant Examiner*—William V Gilbert
(74) *Attorney, Agent, or Firm*—Buchanan Ingersoll & Rooney PC

(57) ABSTRACT

Floorboards for mechanical joining of floors in a herringbone pattern and in parallel rows with horizontal connectors which on the short sides have cooperating locking surfaces which are designed differently from the cooperating locking surfaces on the long sides.

20 Claims, 14 Drawing Sheets

U.S. PATENT DOCUMENTS

| | | | |
|---|---|---|---|
| 714,987 A | 12/1902 | Wolfe | |
| 753,791 A | 3/1904 | Fulghum | |
| 1,124,228 A | 1/1915 | Houston | |
| 1,194,636 A | 8/1916 | Joy | |
| 1,371,856 A | 3/1921 | Cade | |
| 1,407,679 A | 2/1922 | Ruthrauff | |
| 1,454,250 A | 5/1923 | Parsons | |
| 1,468,288 A | 9/1923 | Een | |
| 1,477,813 A | 12/1923 | Daniels et al. | |
| 1,510,924 A | 10/1924 | Daniels et al. | |
| 1,540,128 A | 6/1925 | Houston | |
| 1,575,821 A | 3/1926 | Daniels | |
| 1,602,256 A | 10/1926 | Sellin | |
| 1,602,267 A | 10/1926 | Karwisch | |
| 1,615,096 A | 1/1927 | Meyers | |
| 1,622,103 A | 3/1927 | Fulton | |
| 1,622,104 A | 3/1927 | Fulton | |
| 1,637,634 A | 8/1927 | Carter | |
| 1,644,710 A | 10/1927 | Crooks | |
| 1,660,480 A | 2/1928 | Daniels | |
| 1,714,738 A | 5/1929 | Smith | |
| 1,718,702 A | 6/1929 | Pfiester | |
| 1,723,306 A | 8/1929 | Sipe | |
| 1,734,826 A | 11/1929 | Pick | |
| 1,743,492 A | 1/1930 | Sipe | |
| 1,764,331 A | 6/1930 | Moratz | |
| 1,778,069 A | 10/1930 | Fetz | |
| 1,787,027 A * | 12/1930 | Wasleff | 52/591.1 |
| 1,790,178 A | 1/1931 | Sutherland, Jr. | |
| 1,809,393 A | 6/1931 | Rockwell | |
| 1,823,039 A | 9/1931 | Gruner | |
| 1,859,667 A | 5/1932 | Gruner | |
| 1,898,364 A | 2/1933 | Gynn | |
| 1,906,411 A | 5/1933 | Potvin | |
| 1,925,070 A | 8/1933 | Livezey | |
| 1,929,871 A | 10/1933 | Jones | |
| 1,940,377 A | 12/1933 | Storm | |
| 1,953,306 A | 4/1934 | Moratz | |
| 1,986,739 A | 1/1935 | Mitte | |
| 1,988,201 A | 1/1935 | Hall | |
| 2,015,813 A | 10/1935 | Nielsen | |
| 2,026,511 A | 12/1935 | Storm | |
| 2,044,216 A | 6/1936 | Klages | |
| 2,088,238 A | 7/1937 | Greenway, Jr. | |
| 2,089,075 A | 8/1937 | Siebs | |
| 2,266,464 A | 12/1941 | Kraft | |
| 2,276,071 A | 3/1942 | Scull | |
| 2,303,745 A | 12/1942 | Karreman | |
| 2,324,628 A | 7/1943 | Kähr | |
| 2,398,632 A | 4/1946 | Frost et al. | |
| 2,430,200 A | 11/1947 | Wilson | |
| 2,495,862 A | 1/1950 | Osborn | |
| 2,497,837 A | 2/1950 | Nelson | |
| 2,740,167 A * | 4/1956 | Rowley | 52/591.1 |
| 2,780,253 A | 2/1957 | Joa | |
| 2,851,740 A | 9/1958 | Baker | |
| 2,865,058 A | 12/1958 | Andersson et al. | |
| 2,894,292 A | 7/1959 | Gramelspacher | |
| 2,947,040 A | 8/1960 | Schultz | |
| 3,045,294 A | 7/1962 | Livezey, Jr. | |
| 3,100,556 A | 8/1963 | De Ridder | |
| 3,120,083 A | 2/1964 | Dahlberg et al. | |
| 3,125,138 A | 3/1964 | Bolenbach | |
| 3,182,769 A | 5/1965 | De Ridder | |
| 3,200,553 A | 8/1965 | Frashour et al. | |
| 3,203,149 A | 8/1965 | Soddy | |
| 3,247,638 A | 4/1966 | Gay, Jr. | |
| 3,267,630 A | 8/1966 | Omholt | |
| 3,282,010 A | 11/1966 | King, Jr. | |
| 3,301,147 A | 1/1967 | Clayton et al. | |
| 3,310,919 A | 3/1967 | Bue et al. | |
| 3,347,048 A | 10/1967 | Brown et al. | |
| 3,377,931 A * | 4/1968 | Hilton | 404/35 |
| 3,387,422 A | 6/1968 | Wanzer | |
| 3,436,888 A | 4/1969 | Ottosson | |
| 3,460,304 A | 8/1969 | Braeuninger et al. | |
| 3,481,810 A | 12/1969 | Waite | |
| 3,508,523 A | 4/1970 | De Meerleer et al. | |
| 3,526,420 A | 9/1970 | Brancalcone | |
| 3,538,665 A | 11/1970 | Gohner | |
| 3,548,559 A | 12/1970 | Levine | |
| 3,553,919 A | 1/1971 | Omholt | |
| 3,554,850 A | 1/1971 | Kuhle | |
| 3,555,762 A | 1/1971 | Costanzo, Jr. | |
| 3,579,941 A | 5/1971 | Tibbals | |
| 3,694,983 A | 10/1972 | Couquet | |
| 3,714,747 A | 2/1973 | Curran | |
| 3,731,445 A | 5/1973 | Hoffmann et al. | |
| 3,759,007 A | 9/1973 | Thiele | |
| 3,768,846 A | 10/1973 | Hensley et al. | |
| 3,786,608 A | 1/1974 | Boettcher | |
| 3,842,562 A | 10/1974 | Daigle | |
| 3,857,749 A | 12/1974 | Yoshida | |
| 3,859,000 A | 1/1975 | Webster | |
| 3,902,293 A | 9/1975 | Witt et al. | |
| 3,908,053 A | 9/1975 | Hettich | |
| 3,936,551 A | 2/1976 | Elmendorf et al. | |
| 3,988,187 A | 10/1976 | Witt et al. | |
| 4,037,377 A | 7/1977 | Howell et al. | |
| 4,084,996 A | 4/1978 | Wheeler | |
| 4,090,338 A | 5/1978 | Bourgade | |
| 4,099,358 A | 7/1978 | Compaan | |
| 4,100,710 A | 7/1978 | Kowallik | |
| 4,169,688 A | 10/1979 | Toshio | |
| 4,227,430 A | 10/1980 | Jansson et al. | |
| 4,242,390 A | 12/1980 | Nemeth | |
| 4,299,070 A | 11/1981 | Oltmanns et al. | |
| 4,304,083 A | 12/1981 | Anderson | |
| 4,426,820 A * | 1/1984 | Terbrack et al. | 52/590.1 |
| 4,471,012 A | 9/1984 | Maxwell | |
| 4,489,115 A | 12/1984 | Layman et al. | |
| 4,501,102 A | 2/1985 | Knowles | |
| 4,512,131 A | 4/1985 | Laramore | |
| 4,561,233 A | 12/1985 | Harter et al. | |
| 4,567,706 A | 2/1986 | Wendt | |
| 4,599,841 A | 7/1986 | Haid | |
| 4,612,074 A | 9/1986 | Smith et al. | |
| 4,612,745 A | 9/1986 | Hovde | |
| 4,641,469 A | 2/1987 | Wood | |
| 4,643,237 A | 2/1987 | Rosa | |
| 4,646,494 A | 3/1987 | Saarinen et al. | |
| 4,648,165 A | 3/1987 | Whitehorne | |
| 4,653,242 A | 3/1987 | Ezard | |
| 4,703,597 A | 11/1987 | Eggemar | |
| 4,715,162 A | 12/1987 | Brightwell | |
| 4,716,700 A | 1/1988 | Hagemeyer | |
| 4,738,071 A | 4/1988 | Ezard | |
| 4,769,963 A | 9/1988 | Meyerson | |
| 4,819,932 A | 4/1989 | Trotter, Jr. | |
| 4,822,440 A | 4/1989 | Hsu et al. | |
| 4,831,806 A | 5/1989 | Niese et al. | |
| 4,845,907 A | 7/1989 | Meek | |
| 4,905,442 A | 3/1990 | Daniels | |
| 5,029,425 A | 7/1991 | Bogataj | |
| 5,113,632 A | 5/1992 | Hanson | |
| 5,117,603 A | 6/1992 | Weintraub | |
| 5,148,850 A | 9/1992 | Urbanick | |
| 5,165,816 A | 11/1992 | Parasin | |
| 5,179,812 A | 1/1993 | Hill | |
| 5,213,861 A | 5/1993 | Severson et al. | |
| 5,216,861 A | 6/1993 | Meyerson | |
| 5,253,464 A | 10/1993 | Nilsen | |
| 5,271,564 A | 12/1993 | Smith | |
| 5,286,545 A | 2/1994 | Simmons, Jr. | |

| | | | | | | |
|---|---|---|---|---|---|---|
| 5,295,341 | A | 3/1994 | Kajiwara | 6,584,747 B2 | 7/2003 | Kettler et al. |
| 5,349,796 | A | 9/1994 | Meyerson | 6,591,568 B1 | 7/2003 | Palsson |
| 5,390,457 | A | 2/1995 | Sjölander | 6,601,359 B2 | 8/2003 | Olofsson |
| 5,425,986 | A | 6/1995 | Guyette | 6,606,834 B2 | 8/2003 | Martensson et al. |
| 5,433,806 | A | 7/1995 | Pasquali et al. | 6,647,689 B2 | 11/2003 | Pletzer et al. |
| 5,474,831 | A | 12/1995 | Nystrom | 6,647,690 B1 | 11/2003 | Martensson |
| 5,497,589 | A | 3/1996 | Porter | 6,670,019 B2 | 12/2003 | Andersson |
| 5,502,939 | A | 4/1996 | Zadok et al. | 6,672,030 B2 | 1/2004 | Schulte |
| 5,540,025 | A | 7/1996 | Takehara et al. | 6,684,592 B2 | 2/2004 | Martin |
| 5,560,569 | A | 10/1996 | Schmidt | 6,711,869 B2 | 3/2004 | Tychsen |
| 5,567,497 | A | 10/1996 | Zegler et al. | 6,715,253 B2 | 4/2004 | Pervan |
| 5,570,554 | A | 11/1996 | Searer | 6,722,809 B2 | 4/2004 | Hamberger et al. |
| 5,597,024 | A | 1/1997 | Bolyard et al. | 6,729,091 B1 | 5/2004 | Martensson |
| 5,613,894 | A | 3/1997 | Delle Vedove | 6,763,643 B1 | 7/2004 | Martensson |
| 5,618,602 | A | 4/1997 | Nelson | 6,769,218 B2 | 8/2004 | Pervan |
| 5,630,304 | A | 5/1997 | Austin | 6,769,219 B2 | 8/2004 | Schwitte et al. |
| 5,653,099 | A | 8/1997 | MacKenzie | 6,786,019 B2 | 9/2004 | Thiers |
| 5,671,575 | A | 9/1997 | Wu | 6,851,241 B2 | 2/2005 | Pervan |
| 5,695,875 | A | 12/1997 | Larsson et al. | 6,874,292 B2 | 4/2005 | Moriau et al. |
| 5,706,621 | A | 1/1998 | Pervan | 6,933,043 B1 | 8/2005 | Son et al. |
| 5,755,068 | A | 5/1998 | Ormiston | 7,022,189 B2 | 4/2006 | Delle Vedove |
| 5,768,850 | A | 6/1998 | Chen | 7,040,068 B2 | 5/2006 | Moriau et al. |
| 5,797,237 | A | 8/1998 | Finkell, Jr. | 7,127,860 B2 | 10/2006 | Pervan et al. |
| 5,823,240 | A | 10/1998 | Bolyard et al. | 7,275,350 B2 | 10/2007 | Pervan et al. |
| 5,827,592 | A | 10/1998 | Van Gulik et al. | 7,328,536 B2 | 2/2008 | Moriau et al. |
| 5,860,267 | A | 1/1999 | Pervan | 2001/0029720 A1 | 10/2001 | Pervan |
| 5,899,038 | A | 5/1999 | Stroppiana | 2002/0014047 A1 | 2/2002 | Thiers |
| 5,899,251 | A | 5/1999 | Turner | 2002/0020127 A1 | 2/2002 | Thiers et al. |
| 5,900,099 | A | 5/1999 | Sweet et al. | 2002/0031646 A1 | 3/2002 | Chen et al. |
| 5,925,211 | A | 7/1999 | Rakauskas | 2002/0046528 A1 | 4/2002 | Pervan et al. |
| 5,935,668 | A | 8/1999 | Smith | 2002/0056245 A1 | 5/2002 | Thiers |
| 5,943,239 | A | 8/1999 | Shamblin et al. | 2002/0069611 A1 | 6/2002 | Leopolder |
| 5,950,389 | A | 9/1999 | Porter | 2002/0083673 A1 | 7/2002 | Kettler et al. |
| 5,968,625 | A | 10/1999 | Hudson | 2002/0092263 A1 | 7/2002 | Schulte |
| 5,987,839 | A | 11/1999 | Hamar et al. | 2002/0100231 A1 | 8/2002 | Miller et al. |
| 6,006,486 | A | 12/1999 | Moriau et al. | 2002/0112429 A1 | 8/2002 | Niese et al. |
| 6,023,907 | A * | 2/2000 | Pervan ............... 52/748.1 | 2002/0112433 A1 | 8/2002 | Pervan |
| 6,029,416 | A | 2/2000 | Andersson | 2002/0170257 A1 | 11/2002 | McLain et al. |
| 6,094,882 | A | 8/2000 | Pervan | 2002/0178673 A1 | 12/2002 | Pervan |
| 6,101,778 | A | 8/2000 | Martensson | 2002/0178674 A1 | 12/2002 | Pervan |
| 6,119,423 | A | 9/2000 | Costantino | 2002/0178682 A1 | 12/2002 | Pervan |
| 6,134,854 | A | 10/2000 | Stanchfield | 2003/0009972 A1 | 1/2003 | Pervan et al. |
| 6,148,884 | A | 11/2000 | Bolyard et al. | 2003/0024199 A1 | 2/2003 | Pervan et al. |
| 6,173,548 | B1 | 1/2001 | Hamar et al. | 2003/0024200 A1 | 2/2003 | Moriau et al. |
| 6,182,410 | B1 | 2/2001 | Pervan | 2003/0033777 A1 | 2/2003 | Thiers et al. |
| 6,189,283 | B1 | 2/2001 | Bentley et al. | 2003/0033784 A1 | 2/2003 | Pervan |
| 6,203,653 | B1 | 3/2001 | Seidner | 2003/0041545 A1 | 3/2003 | Stanchfield |
| 6,205,639 | B1 | 3/2001 | Pervan | 2003/0084636 A1 | 5/2003 | Pervan |
| 6,209,278 | B1 | 4/2001 | Tychsen | 2003/0101674 A1 * | 6/2003 | Pervan et al. ............... 52/592.1 |
| 6,216,403 | B1 | 4/2001 | Belbeoc'h | 2003/0101681 A1 | 6/2003 | Tychsen |
| 6,216,409 | B1 | 4/2001 | Roy et al. | 2003/0115812 A1 | 6/2003 | Pervan |
| 6,226,951 | B1 | 5/2001 | Azar | 2003/0115821 A1 | 6/2003 | Pervan |
| 6,247,285 | B1 | 6/2001 | Moebus | 2003/0196397 A1 | 10/2003 | Niese et al. |
| 6,314,701 | B1 | 11/2001 | Meyerson | 2003/0196405 A1 | 10/2003 | Pervan |
| 6,324,803 | B1 | 12/2001 | Pervan | 2003/0221387 A1 * | 12/2003 | Shah ............... 52/592.1 |
| 6,332,733 | B1 | 12/2001 | Hamberger et al. | 2003/0233809 A1 | 12/2003 | Pervan |
| 6,339,908 | B1 | 1/2002 | Chuang | 2004/0016196 A1 | 1/2004 | Pervan |
| 6,345,481 | B1 | 2/2002 | Nelson | 2004/0035078 A1 | 2/2004 | Pervan |
| 6,363,677 | B1 | 4/2002 | Chen et al. | 2004/0035079 A1 * | 2/2004 | Evjen ............... 52/592.1 |
| 6,385,936 | B1 | 5/2002 | Schneider | 2004/0045254 A1 | 3/2004 | Van der Heijden |
| 6,397,547 | B1 | 6/2002 | Martensson | 2004/0068954 A1 | 4/2004 | Martensson |
| 6,418,683 | B1 | 7/2002 | Martensson et al. | 2004/0139678 A1 | 7/2004 | Pervan |
| 6,421,970 | B1 | 7/2002 | Martensson et al. | 2004/0241374 A1 | 12/2004 | Thiers et al. |
| 6,438,919 | B1 | 8/2002 | Knauseder | 2004/0255541 A1 | 12/2004 | Thiers |
| 6,446,405 | B1 | 9/2002 | Pervan | 2005/0034404 A1 | 2/2005 | Pervan |
| 6,490,836 | B1 | 12/2002 | Moriau et al. | 2005/0034405 A1 | 2/2005 | Pervan |
| 6,497,079 | B1 | 12/2002 | Pletzer et al. | 2005/0055943 A1 | 3/2005 | Pervan |
| 6,505,452 | B1 | 1/2003 | Hannig et al. | 2005/0102937 A1 | 5/2005 | Pervan |
| 6,510,665 | B2 | 1/2003 | Pervan | 2005/0108970 A1 * | 5/2005 | Liu ............... 52/581 |
| 6,516,579 | B1 | 2/2003 | Pervan | 2005/0138881 A1 | 6/2005 | Pervan |
| 6,526,719 | B2 | 3/2003 | Pletzer et al. | 2005/0161468 A1 | 7/2005 | Wagner |
| 6,532,709 | B2 | 3/2003 | Pervan | 2005/0193675 A1 | 9/2005 | Smart et al. |
| 6,536,178 | B1 | 3/2003 | Palsson et al. | 2005/0193677 A1 | 9/2005 | Vogel |

| | | | | | | |
|---|---|---|---|---|---|---|
| 2005/0208255 A1 | 9/2005 | Pervan | | DE | 86 04 004 | 6/1986 |
| 2005/0210810 A1 | 9/2005 | Pervan | | DE | 35 12 204 A1 | 10/1986 |
| 2005/0235593 A1 | 10/2005 | Hecht | | DE | 35 44 845 A1 | 6/1987 |
| 2006/0032168 A1* | 2/2006 | Thiers et al. ............... 52/390 | | DE | 36 31 390 A1 | 12/1987 |
| 2006/0117696 A1 | 6/2006 | Pervan | | DE | 40 02 547 A1 | 8/1991 |
| 2006/0196139 A1 | 9/2006 | Pervan et al. | | DE | 41 30 115 A1 | 9/1991 |
| 2006/0283127 A1 | 12/2006 | Pervan | | DE | 41 34 452 A1 | 4/1993 |
| 2007/0119110 A1 | 5/2007 | Pervan | | DE | 42 15 273 A1 | 11/1993 |
| 2007/0159814 A1 | 7/2007 | Jacobsson | | DE | 42 42 530 A1 | 6/1994 |
| 2008/0000179 A1 | 1/2008 | Pervan et al. | | DE | 43 13 037 C1 | 8/1994 |
| 2008/0000180 A1 | 1/2008 | Pervan | | DE | 93 17 191 U1 | 3/1995 |
| 2008/0000182 A1 | 1/2008 | Pervan | | DE | 296 10 462 | 10/1996 |
| 2008/0000186 A1 | 1/2008 | Pervan | | DE | 196 01 322 A1 | 5/1997 |
| 2008/0000187 A1 | 1/2008 | Pervan | | DE | 296 18 318 U1 | 5/1997 |
| 2008/0000188 A1 | 1/2008 | Pervan | | DE | 297 10 175 U1 | 9/1997 |
| 2008/0000189 A1 | 1/2008 | Pervan et al. | | DE | 196 51 149 A1 | 6/1998 |
| 2008/0000194 A1 | 1/2008 | Pervan et al. | | DE | 197 09 641 A1 | 9/1998 |
| 2008/0000417 A1 | 1/2008 | Pervan et al. | | DE | 197 18 319 A1 | 11/1998 |
| 2008/0005989 A1 | 1/2008 | Pervan et al. | | DE | 197 18 812 A1 | 11/1998 |
| 2008/0005992 A1 | 1/2008 | Pervan | | DE | 299 22 649 U1 | 4/2000 |
| 2008/0005997 A1 | 1/2008 | Pervan | | DE | 200 01 225 U1 | 8/2000 |
| 2008/0005998 A1 | 1/2008 | Pervan | | DE | 200 02 744 U1 | 9/2000 |
| 2008/0005999 A1 | 1/2008 | Pervan | | DE | 199 25 248 A1 | 12/2000 |
| 2008/0008871 A1 | 1/2008 | Pervan | | DE | 200 13 380 | 12/2000 |
| 2008/0010931 A1 | 1/2008 | Pervan et al. | | DE | 200 17 461 U1 | 3/2001 |
| 2008/0010937 A1 | 1/2008 | Pervan et al. | | DE | 200 18 284 U1 | 3/2001 |
| 2008/0028713 A1 | 2/2008 | Pervan et al. | | DE | 100 01 248 | 7/2001 |
| 2008/0034701 A1 | 2/2008 | Pervan | | DE | 100 32 204 C1 | 7/2001 |
| 2008/0034708 A1 | 2/2008 | Pervan | | DE | 100 44 016 A1 | 3/2002 |
| 2008/0041007 A1 | 2/2008 | Pervan et al. | | DE | 202 05 774 | 9/2002 |
| 2008/0041008 A1 | 2/2008 | Pervan | | DE | 203 07 580 U1 | 7/2003 |
| 2008/0060308 A1 | 3/2008 | Pervan | | DE | 203 17 527 | 2/2004 |
| 2008/0066415 A1 | 3/2008 | Pervan et al. | | DE | 20 2004 001 038 U1 | 5/2004 |
| 2008/0110125 A1 | 5/2008 | Pervan | | DE | 20 2005 006 300 U1 | 8/2005 |
| 2008/0134613 A1 | 6/2008 | Pervan | | DE | 10 2004 054 368 A1 | 5/2006 |
| 2008/0134614 A1 | 6/2008 | Pervan et al. | | EP | 0 248 127 A1 | 12/1987 |
| 2008/0168730 A1 | 7/2008 | Pervan et al. | | EP | 0 487 925 A1 | 6/1992 |
| 2008/0168736 A1 | 7/2008 | Pervan | | EP | 0 623 724 A1 | 11/1994 |
| 2008/0209837 A1 | 9/2008 | Pervan | | EP | 0 652 340 A1 | 5/1995 |
| 2008/0209838 A1 | 9/2008 | Pervan | | EP | 0 665 347 | 8/1995 |
| | | | | EP | 0 690 185 A1 | 1/1996 |
| FOREIGN PATENT DOCUMENTS | | | | EP | 0 698 162 B1 | 2/1996 |
| | | | | EP | 0 843 763 B1 | 5/1998 |
| AU | 713628 | 1/1998 | | EP | 0 849 416 A2 | 6/1998 |
| AU | 200020703 A1 | 6/2000 | | EP | 0 855 482 B1 | 7/1998 |
| BE | 417526 | 9/1936 | | EP | 0 877 130 B1 | 11/1998 |
| BE | 0557844 | 6/1957 | | EP | 0 958 441 | 11/1998 |
| BE | 1010339 A3 | 6/1998 | | EP | 0 661 135 B1 | 12/1998 |
| BE | 1010487 A6 | 10/1998 | | EP | 0 903 451 A2 | 3/1999 |
| CA | 0991373 | 6/1976 | | EP | 0 969 163 A2 | 1/2000 |
| CA | 2226286 | 12/1997 | | EP | 0 969 163 A3 | 1/2000 |
| CA | 2252791 | 5/1999 | | EP | 0 969 164 A2 | 1/2000 |
| CA | 2289309 | 7/2000 | | EP | 0 969 164 A3 | 1/2000 |
| CA | 2 363 184 | 7/2001 | | EP | 0 974 713 A1 | 1/2000 |
| CH | 200949 | 1/1939 | | EP | 0 976 889 | 2/2000 |
| CH | 211877 | 1/1941 | | EP | 1 048 423 A2 | 11/2000 |
| CH | 690242 A5 | 6/2000 | | EP | 1 120 515 A1 | 8/2001 |
| DE | 1 212 275 | 3/1966 | | EP | 1 146 182 A2 | 10/2001 |
| DE | 7102476 | 1/1971 | | EP | 1 165 906 | 1/2002 |
| DE | 1 534 278 | 11/1971 | | EP | 1 223 265 | 7/2002 |
| DE | 2 159 042 | 6/1973 | | EP | 1 251 219 A1 | 10/2002 |
| DE | 2 205 232 | 8/1973 | | EP | 1 262 609 | 12/2002 |
| DE | 7402354 | 1/1974 | | EP | 1 317 983 A2 | 6/2003 |
| DE | 2 238 660 | 2/1974 | | EP | 1 338 344 A2 | 8/2003 |
| DE | 2 252 643 | 5/1974 | | FI | 843060 | 8/1984 |
| DE | 2 502 992 | 7/1976 | | FR | 1 293 043 | 4/1962 |
| DE | 2 616 077 | 10/1977 | | FR | 2 568 295 | 1/1986 |
| DE | 2 917 025 | 11/1980 | | FR | 2 630 149 | 10/1989 |
| DE | 30 41781 A1 | 6/1982 | | FR | 2 637 932 A1 | 4/1990 |
| DE | 32 14 207 A1 | 11/1982 | | FR | 2 675 174 | 10/1992 |
| DE | 32 46 376 C2 | 6/1984 | | FR | 2 691 491 | 11/1993 |
| DE | 33 43 601 A1 | 6/1985 | | FR | 2 697 275 | 4/1994 |
| DE | 35 38 538 A1 | 10/1985 | | FR | 2 712 329 A1 | 5/1995 |

| | | |
|---|---|---|
| FR | 2 781 513 A1 | 1/2000 |
| FR | 2 785 633 A1 | 5/2000 |
| FR | 2 810 060 | 12/2001 |
| FR | 2 810 060 A1 | 12/2001 |
| FR | 2 846 023 | 4/2004 |
| GB | 240629 | 10/1925 |
| GB | 424057 | 2/1935 |
| GB | 585205 | 1/1947 |
| GB | 599793 | 3/1948 |
| GB | 636423 | 4/1950 |
| GB | 812671 | 4/1959 |
| GB | 1127915 | 10/1968 |
| GB | 1171337 | 11/1969 |
| GB | 1237744 | 6/1971 |
| GB | 1275511 | 5/1972 |
| GB | 1 394 621 | 5/1975 |
| GB | 1430423 | 3/1976 |
| GB | 2117813 A | 10/1983 |
| GB | 2126106 A | 3/1984 |
| GB | 2243381 A | 10/1991 |
| GB | 2256023 A | 11/1992 |
| JP | 54-65528 | 5/1979 |
| JP | 57-119056 | 7/1982 |
| JP | 57-185110 | 11/1982 |
| JP | 59-186336 | 11/1984 |
| JP | 3-169967 | 7/1991 |
| JP | 4-106264 | 4/1992 |
| JP | 4-191001 | 7/1992 |
| JP | 5-148984 | 6/1993 |
| JP | 6-56310 | 5/1994 |
| JP | 6-146553 | 5/1994 |
| JP | 6-320510 | 11/1994 |
| JP | 7-076923 | 3/1995 |
| JP | 7-180333 | 7/1995 |
| JP | 7-300979 | 11/1995 |
| JP | 7-310426 | 11/1995 |
| JP | 8-109734 | 4/1996 |
| JP | 9-38906 | 2/1997 |
| JP | 9-88315 | 3/1997 |
| JP | 10-219975 A | 8/1998 |
| JP | 2000-179137 | 6/2000 |
| JP | P2000226932 | 8/2000 |
| JP | 2001-173213 | 6/2001 |
| JP | 2001-179710 | 7/2001 |
| JP | 2001-254503 | 9/2001 |
| JP | 2001-260107 | 9/2001 |
| JP | P2001329681 | 11/2001 |
| NL | 7601773 | 8/1976 |
| NO | 157871 | 7/1984 |
| NO | 305614 | 5/1995 |
| PL | 24931 U | 11/1974 |
| SE | 372 051 | 5/1973 |
| SE | 450 141 | 6/1984 |
| SE | 501 014 C2 | 10/1994 |
| SE | 502 994 | 3/1996 |
| SE | 506 254 C2 | 11/1997 |
| SE | 509 059 | 6/1998 |
| SE | 509 060 | 6/1998 |
| SE | 512 290 | 12/1999 |
| SE | 512 313 | 12/1999 |
| SE | 0000200-6 | 7/2001 |
| SU | 363795 | 11/1973 |
| SU | 1680359 A1 | 9/1991 |
| WO | WO 84/02155 | 6/1984 |
| WO | WO 87/03839 A1 | 7/1987 |
| WO | WO 92/17657 | 10/1992 |
| WO | WO 93/13280 | 7/1993 |
| WO | WO 94/01628 | 1/1994 |
| WO | WO 94/26999 | 11/1994 |
| WO | WO 96/27719 | 9/1996 |
| WO | WO 96/27721 | 9/1996 |
| WO | WO 96/30177 A1 | 10/1996 |
| WO | 97/19232 | 5/1997 |
| WO | WO 97/47834 | 12/1997 |
| WO | WO 98/22677 A1 | 5/1998 |
| WO | WO 98/24994 | 6/1998 |
| WO | WO 98/24995 | 6/1998 |
| WO | WO 98/38401 A1 | 9/1998 |
| WO | WO 99/40273 A1 | 8/1999 |
| WO | WO 99/66151 | 12/1999 |
| WO | WO 99/66152 | 12/1999 |
| WO | WO 00/06854 | 1/2000 |
| WO | WO 00/20705 A1 | 4/2000 |
| WO | WO 00/20706 A1 | 4/2000 |
| WO | WO 00/66856 A1 | 11/2000 |
| WO | 01/02669 | 1/2001 |
| WO | WO 01/02672 A1 | 1/2001 |
| WO | 01/07729 | 2/2001 |
| WO | 01/51733 A1 | 7/2001 |
| WO | WO 01/66876 A1 | 9/2001 |
| WO | WO 01/66877 A1 | 9/2001 |
| WO | WO 01/75247 A1 | 10/2001 |
| WO | WO 01/77461 A1 | 10/2001 |
| WO | 01/96688 | 12/2001 |
| WO | 01/98603 | 12/2001 |
| WO | WO 01/98604 A1 | 12/2001 |
| WO | 02/050810 A1 | 7/2002 |
| WO | 02/055809 A1 | 7/2002 |
| WO | 02/055810 A1 | 7/2002 |
| WO | 02/060691 | 8/2002 |
| WO | 03/016654 | 2/2003 |
| WO | WO 03/025307 A1 | 3/2003 |
| WO | 03/070384 A1 | 8/2003 |
| WO | 03/078761 A1 | 9/2003 |
| WO | WO 03/074814 A1 | 9/2003 |
| WO | WO 03/089736 A1 | 10/2003 |
| WO | 03/099461 A1 | 12/2003 |
| WO | WO 2004/083557 A1 | 9/2004 |
| WO | 2005/077625 A1 | 8/2005 |
| WO | 2005/110677 A1 | 11/2005 |
| WO | 2006/008578 A1 | 1/2006 |
| WO | 2006/111437 A1 | 10/2006 |
| WO | 2006/113757 A2 | 10/2006 |

OTHER PUBLICATIONS

Knight's American Mechanical Dictionary, Hurd and Houghton: New York (1876), p. 2051.
Opposition EP 0.698,162 B1—Facts-Grounds-Arguments, dated Apr. 1, 1999, pp. 1-56.
Opposition II EP 0.698,162 B1—Facts-Grounds-Arguments, dated Apr. 30, 1999, (17 pages)—with translation (11 pages).
Opposition I: Unilin Decor N.V./Välinge Aluminum AB, communication dated Jun. 8, 1999 to European Patent Office, pp. 1-2.
Opposition I: Unilin Decor N.V./Välinge Aluminum AB, communication dated Jun. 16, 1999 to European Patent Office, pp. 1-2.
FI Office Action dated Mar. 19, 1998.
NO Office Action dated Dec. 22, 1997.
NO Office Action dated Sep. 21, 1998.
Opposition EP 0.877.130 B1—Facts—Arguments, dated Jun. 28, 2000, pp. 1-13.
RU Application Examiner Letter dated Sep. 26, 1997.
NZ Application Examiner Letter dated Oct. 21, 1999.
European prosecution file history to grant, European Patent No. 94915725.9-2303/0698162, grant date Sep. 16, 1998.
European prosecution file history to grant, European Patent No. 98106535.2-2303/0855482, grant date Dec. 1, 1999.
European prosecution file history to grant, European Patent No. 98201555.4-2303/0877130, grant date Jan. 26, 2000.
Communication of Notices of Intervention by E.F.P. Floor Products dated Mar. 17, 2000 in European Patent Application 0698162, pp. 1-11 with annex pp. 1-21.
Response to the E.F.P. Floor Products intervention dated Jun. 28, 2000, pp. 1-5.
Letters from the Opponent dated Jul. 26, 2001 and Jul. 30, 2001 including Annexes 1 to 3.

Communication from European Patent Office dated Sep. 20, 2001 in European Patent No. 0698162, pp. 1-2 with Facts and Submissions Annex pp. 1-18, Minutes Annex pp. 1-11, and Annex I to VI.

Communication from Swedish Patent Office dated Sep. 21, 2001 in Swedish Patent No. 9801986-2, pp. 1-3 in Swedish with forwarding letter dated Sep. 24, 2001 in English.

Välinge, "Fibo-Trespo" Brochure, Distributed at the Domotex Fair In Hannover, Germany, Jan. 1996.

Träindustrins Handbook "Snickeriarbete", 2nd Edition, Malmö 1952, pp. 826, 827, 854, and 855, published by Teknografiska Aktiebolaget, Sweden.

"Träbearbetning", Anders Grönlund, 1986, ISBN 91-970513-2-2, pp. 357-360, published by Institutet for Trateknisk Forskning, Stockholm, Sweden.

Drawing Figure 25/6107 from Buetec Gmbh dated Dec. 16, 1985.

Pamphlet from Serexhe for Compact-Praxis, entitled "Selbst Teppichböden, PVC and Parkett verlegen", Published by Compact Verlag, München, Germany 1985, pp. 84-87.

Pamphlet from Junckers Industrser A/S entitled"Bøjlesystemet til Junckers boliggulve" Oct. 1994, , Published by Junckers Industrser A/S, Denmark.

Pamphlet from Junckers Industrser A/S entitled "The Clip System for Junckers Sports Floors", Annex 7, 1994, Published by Junckers Industrser A/S, Denmark.

Pamphlet from Junckers Industrser A/S entitled "The Clip System for Junckers Domestic Floors", Annex 8, 1994, Published by Junckers Industrser A/S, Denmark.

Fibo-Trespo Alloc System Brochure entitled "Opplæring OG Autorisasjon", pp. 1-29, Fibo-Trespo.

"Revolution bei der Laminatboden-Verl", boden wand decke, vol. No. 11 of 14, Jan. 10, 1997, p. 166.

Kährs Focus Extra dated Jan. 2001, pp. 1-9.

Brochure for CLIC Laminate Flooring, Art.-Nr. 110 11 640.

Brochure for Laminat-Boden "Clever-Click", Parador® Wohnsysteme.

Brochure for PERGO®, CLIC Laminate Flooring, and Prime Laminate Flooring from Bauhaus, The Home Store, Malmö, Sweden.

Darko Pervan, U.S. Appl. No. 09/714,514 entitled "Locking System and Flooring Board" filed Nov. 17, 2000.

Darko Pervan, U.S. Appl. No. 10/730,131 entitled "Floorboards, Flooring Systems and Methods for Manufacturing and Installation Thereof" filed Dec. 9, 2003.

Darko Pervan, U.S. Appl. No. 10/768,677 entitled "Mechanical Locking System for Floorboards" filed Feb. 2, 2004.

Darko Pervan, U.S. Appl. No. 10/708,314 entitled "Floorboard and Method of Manufacturing Thereof" filed Feb. 24, 2004.

Darko Pervan et al., U.S. Appl. No. 10/508,198 entitled "Floorboards With Decorative Grooves" filed Sep. 20, 2004.

Darko Pervan, U.S. Appl. No. 10/509,885 entitled "Mechanical Locking System for Floorboards" filed Oct. 4, 2004.

Darko Pervan, U.S. Appl. No. 10/510,580 entitled "Floorboards for Floorings" filed Oct. 8, 2004.

Darko Pervan, U.S. Appl. No. 10/970,282 entitled "Mechanical Locking System for Floor Panels" filed Oct. 22, 2004.

Darko Pervan, U.S. Appl. No. 10/975,923 entitled "Flooring Systems and Methods for Installation" filed Oct. 29, 2004.

Darko Pervan, U.S. Appl. No. 11/000,912 entitled "Floorboard, System and Method for Forming a Flooring, and Flooring Formed Thereof" filed Dec. 2, 2004.

Darko Pervan, U.S. Appl. No. 11/008,213 entitled "Metal Strip for Interlocking Floorboard and a Floorbaord Using Same" filed Dec. 10, 2004.

Darko Pervan, U.S. Appl. No. 11/034,059 entitled "Floor Covering and Locking System" filed Jan. 13, 2005.

Darko Pervan, U.S. Appl. No. 11/034,060 entitled "Floor Covering and Locking System" filed Jan. 13, 2005.

Darko Pervan, U.S. Appl. No. 10/906,356 entitled "Building Panel With Compressed Edges and Method of Making Same" filed Feb. 15, 2005.

Darko Pervan, U.S. Appl. No. 11/092,748 entitled "Mechanical Locking System for Panels and Method of Installing Same" filed Mar. 30, 2005.

Darko Pervan, U.S. Appl. No. 10/908,658 entitled "Mechanical Locking System for Floor Panels" filed May 20, 2005.

U.S. Appl. No. 11/161,520; Pervan et al.; filed Aug. 6, 2005.

U.S. Appl. No. 11/163,085; Pervan et al.; filed Oct. 4, 2005.

Jacobsson, Jan, et al, U.S. Appl. No. 11/521,439, entitled "Device and Method for Compressing an Edge of a Building Panel and a Building Panel With Compressed Edges", filed on Sep. 15, 2006.

Pervan, Darko, U.S. Appl. No. 11/627,971, entitled "Locking System for Floorboards", filed on Jan. 28, 2007.

Pervan, Darko, et al., U.S. Appl. No. 11/635,674, entitled "Laminate Floor Panels," filed Dec. 8, 2006.

Pervan, Darko, et al., U.S. Appl. No. 11/635,633, entitled "Laminate Floor Panels," filed Dec. 8, 2006.

Hakansson, Niclas, U.S. Appl. No. 11/643,881, entitled "V-GROOVE," filed Dec. 22, 2006.

Bergelin, Marcus, et al., U.S. Appl. No. 11/649,837, entitled "Resilient Groove," filed Jan. 5, 2007.

Pervan, Darko, et al., U.S. Appl. No. 11/575,600, entitled "Mechanical Locking of Floor Panels with a Flexible Tongue," filed Mar. 20, 2007.

Pervan, Darko, U.S. Appl. No. 11/806,478, entitled "Wear Resistant Surface," filed May 31, 2007.

Pervan, Darko, et al., U.S. Appl. No. 11/770,771, entitled "Locking System Comprising a Combination Lock for Panels," filed Jun. 29, 2007.

Pervan, Darko, et al., U.S. Appl. No. 11/775,885, entitled "Mechanical Locking of Floor Panels with a Flexible Bristle Tongue," filed Jul. 11, 2007.

Pervan, Darko, U.S. Appl. No. 11/839,259, entitled "Locking System and Flooring Board," filed Aug. 15, 2007.

* cited by examiner

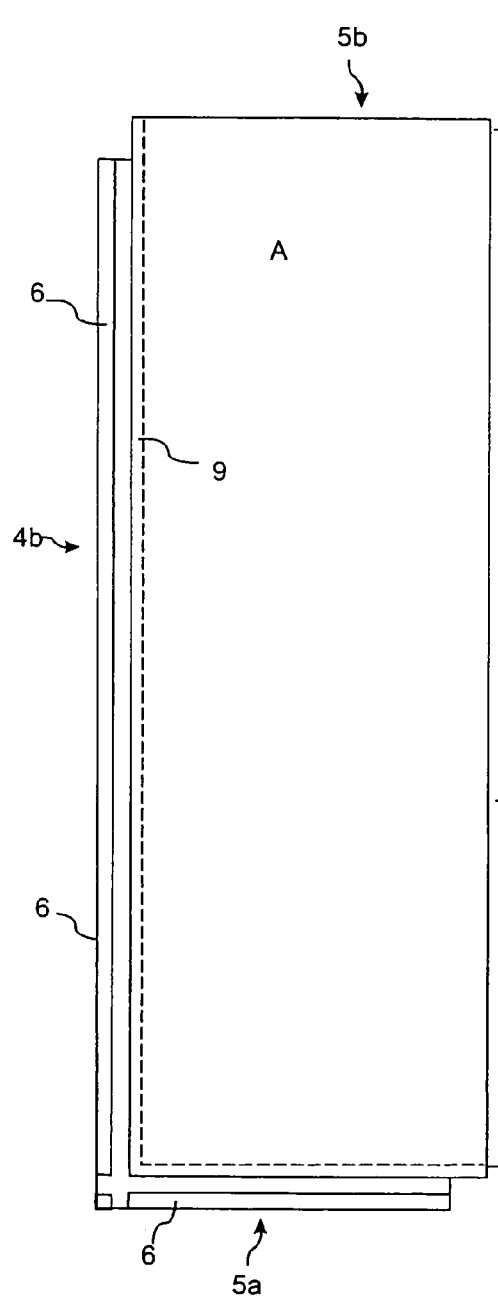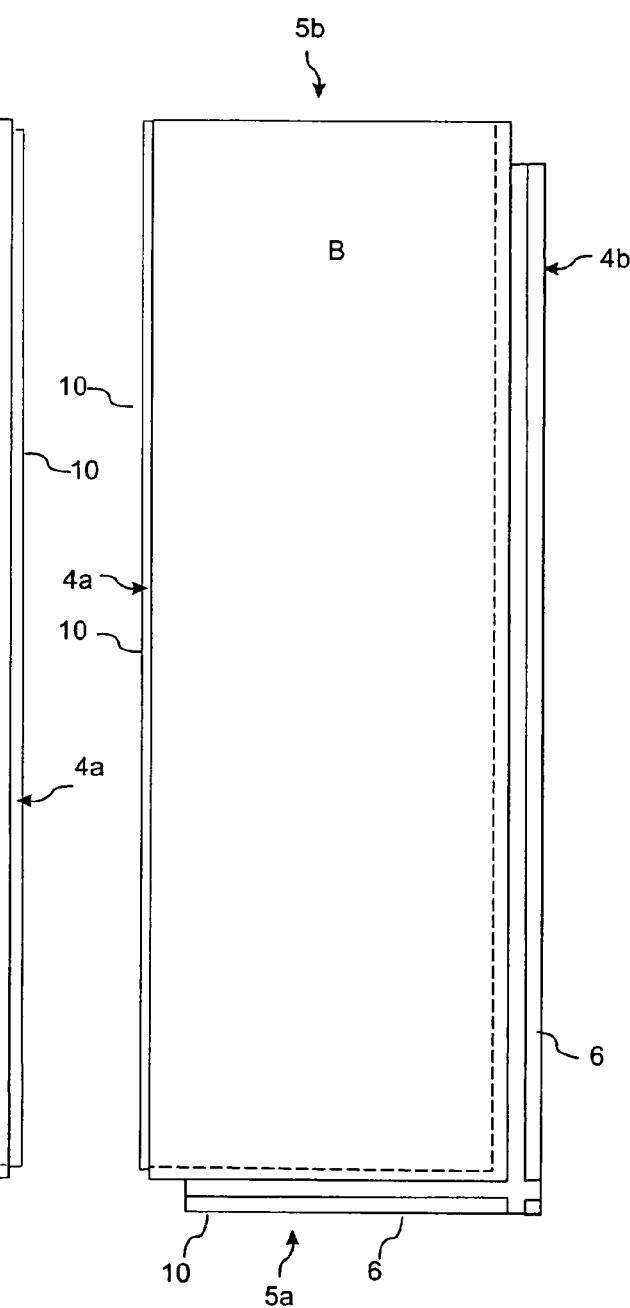

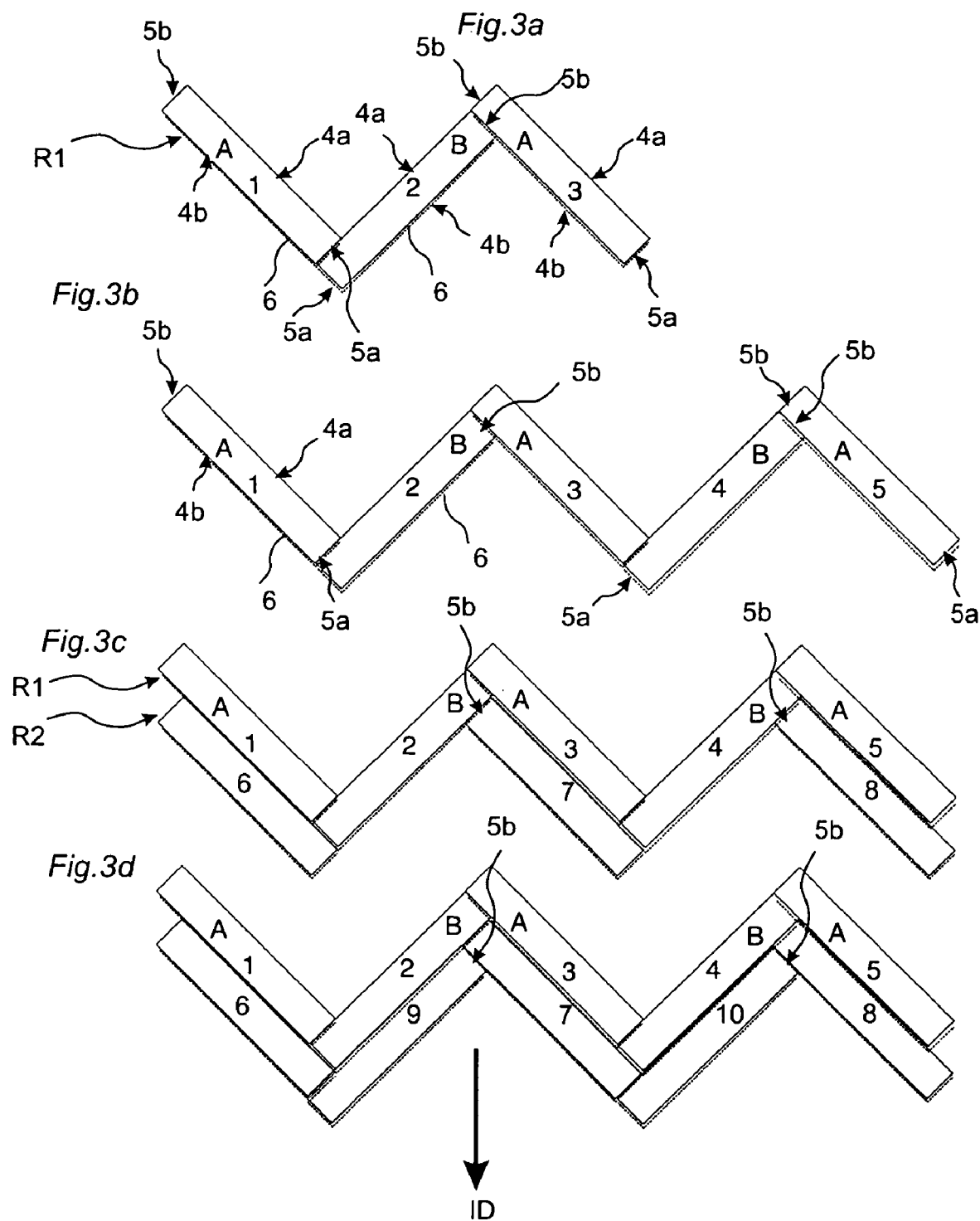

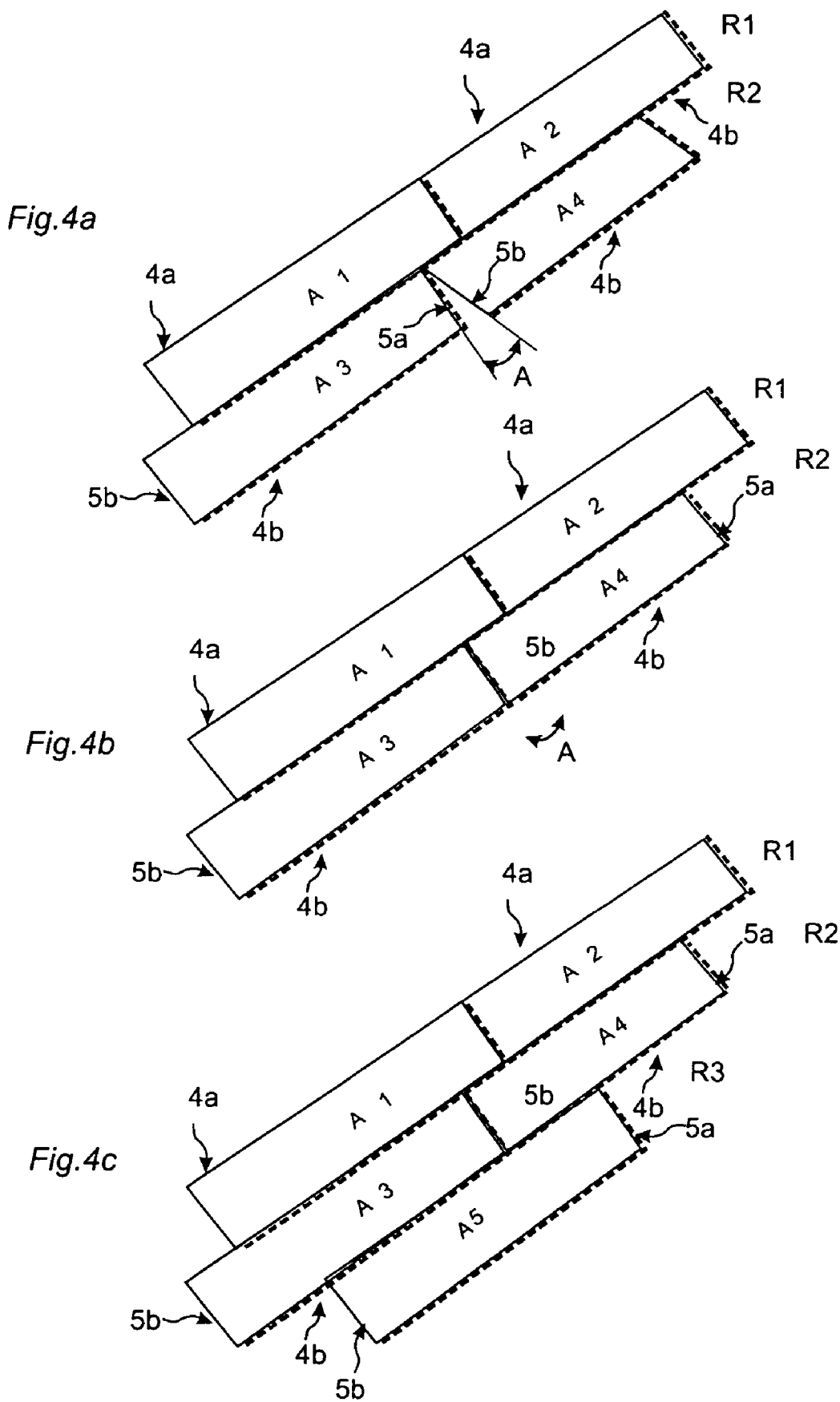

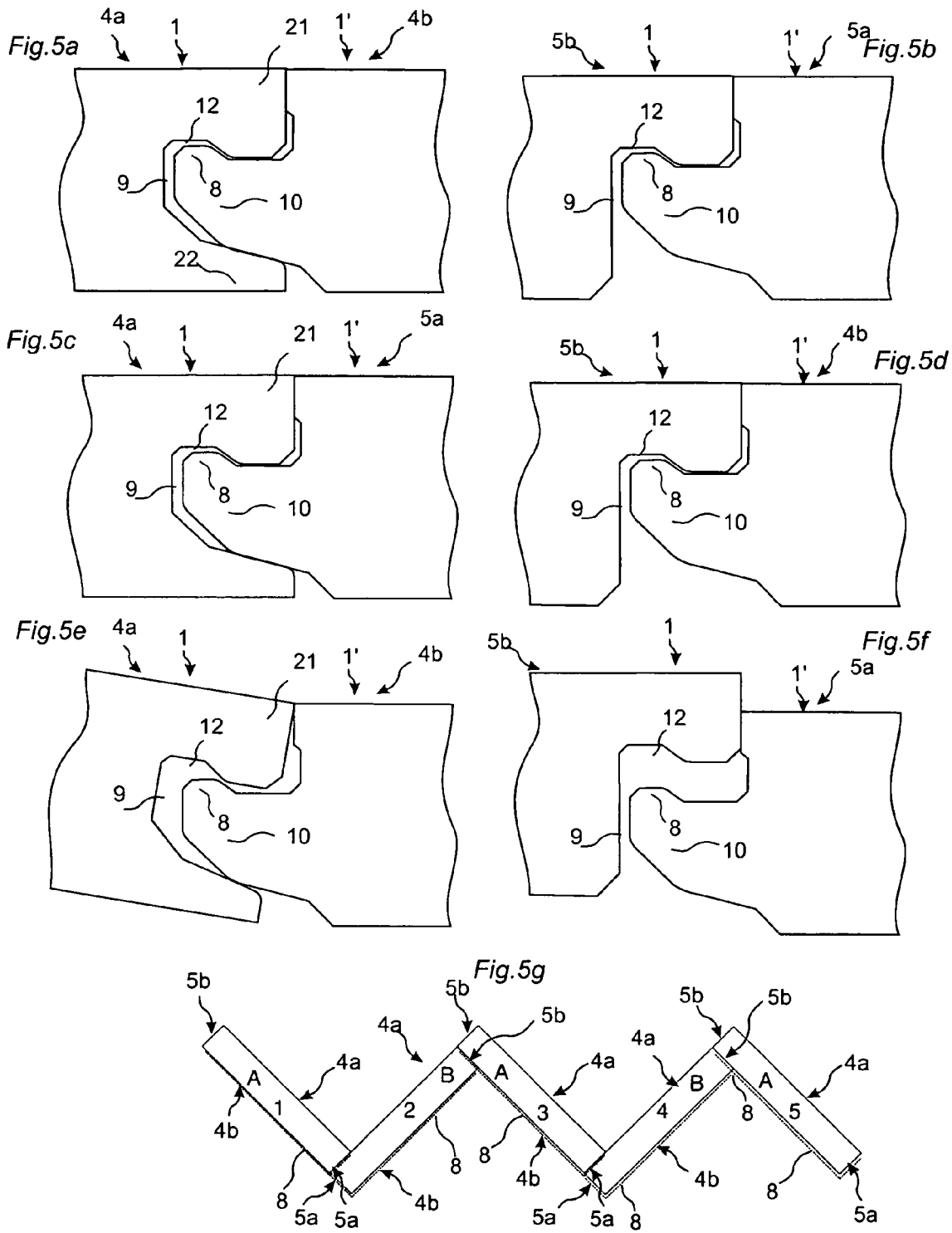

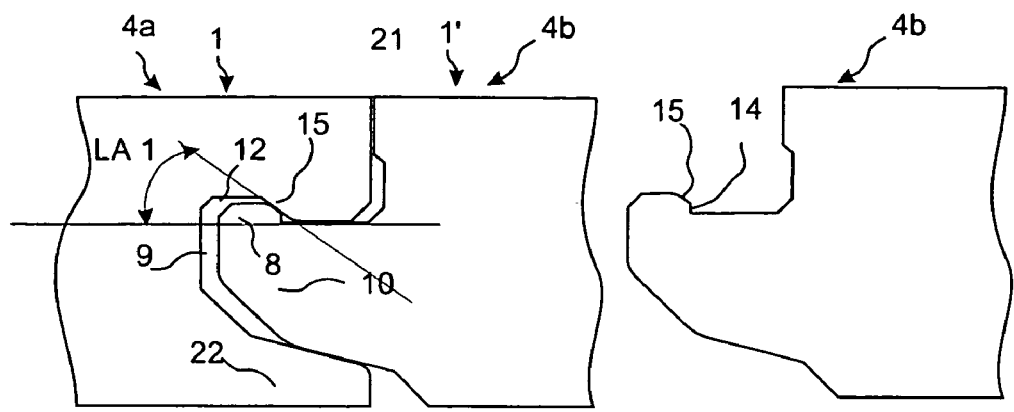
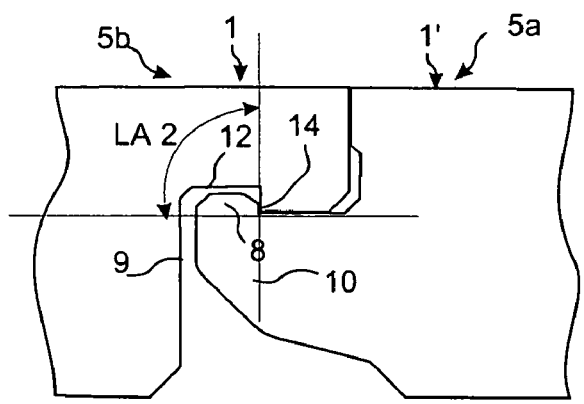
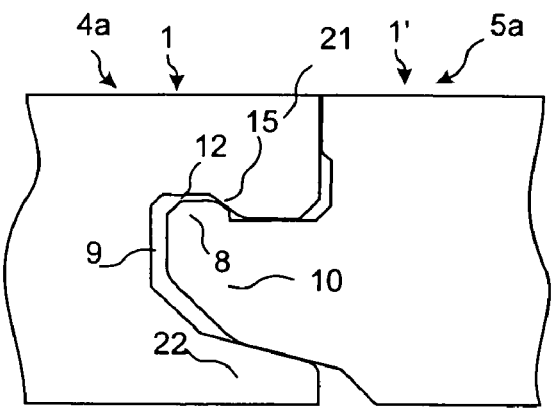
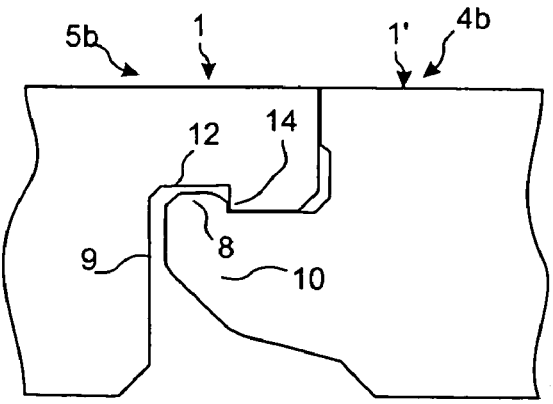

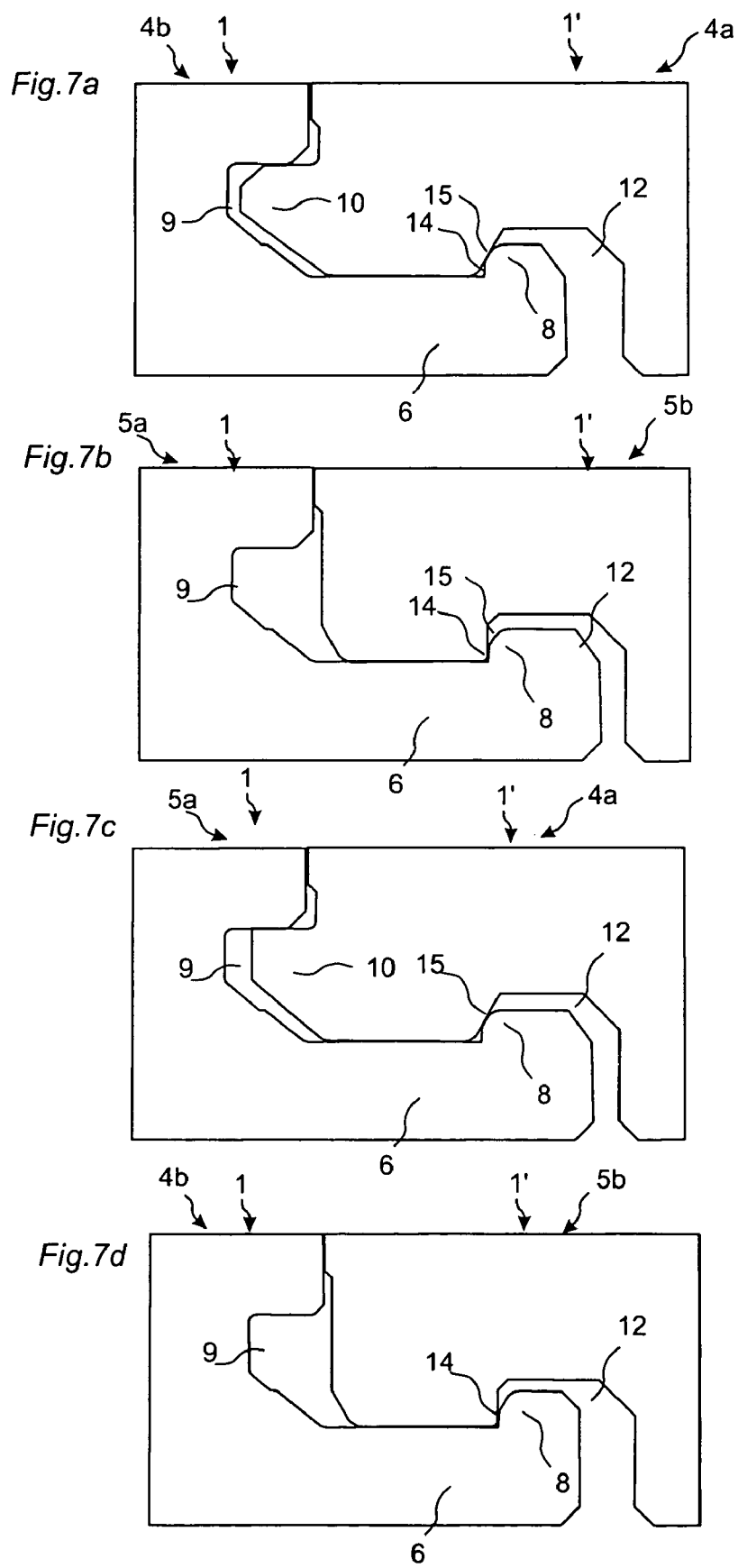

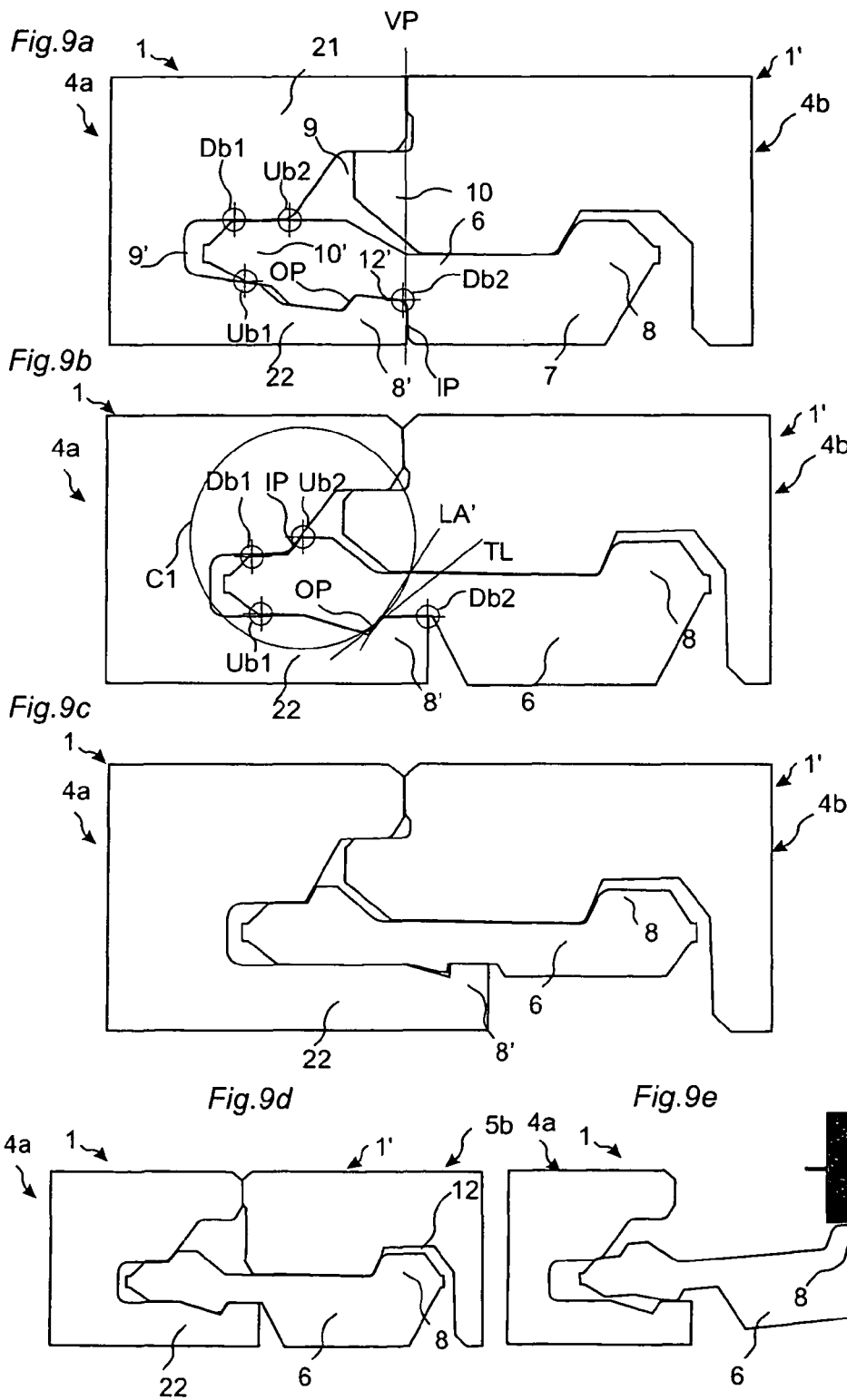

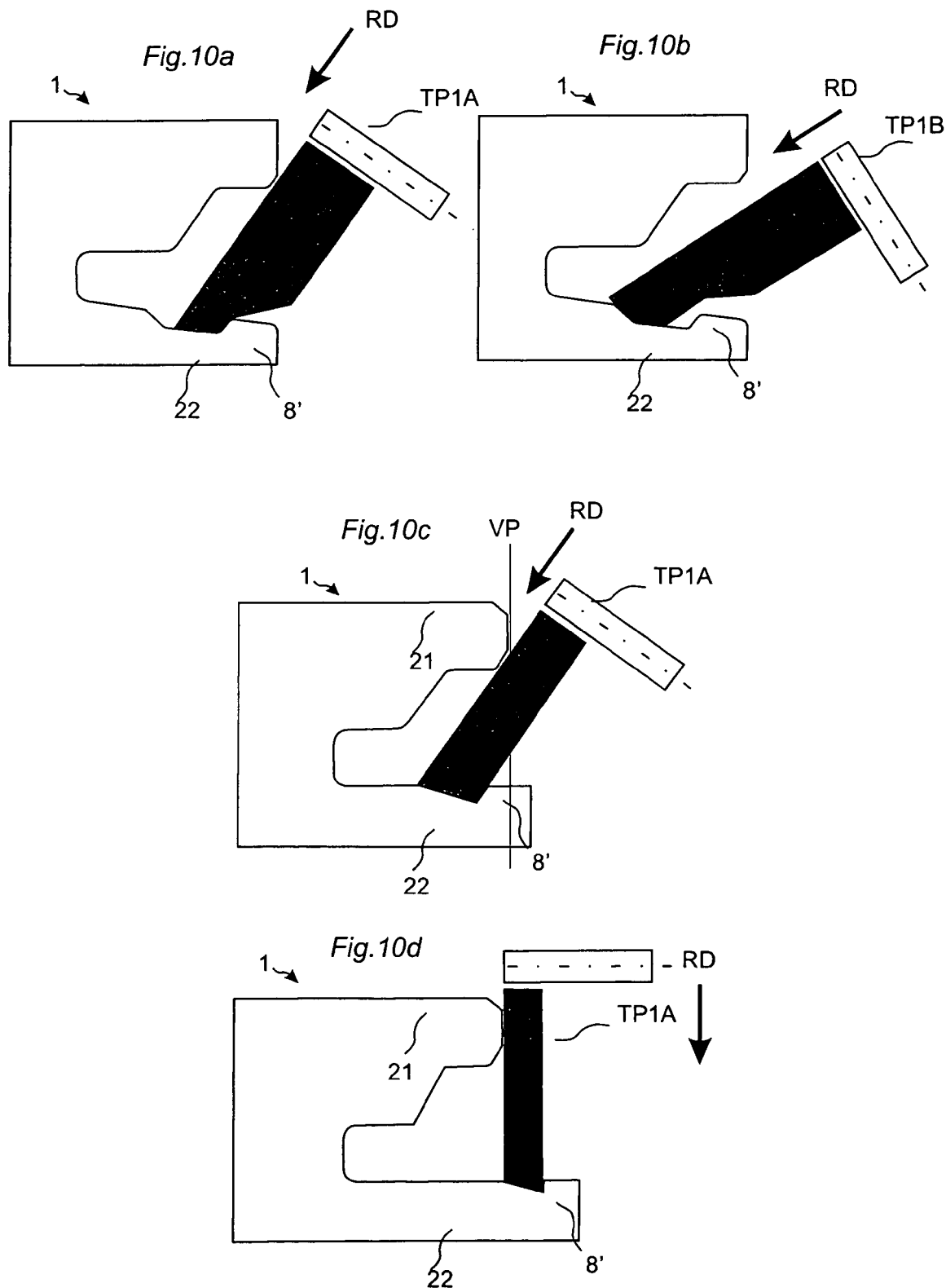

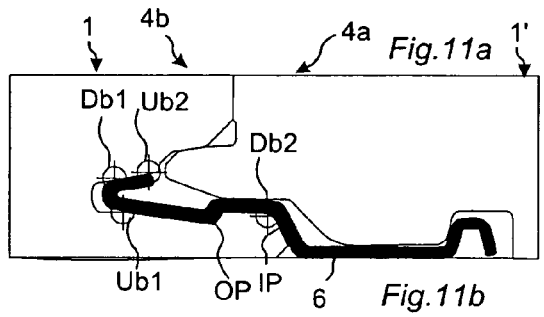
Fig.11a
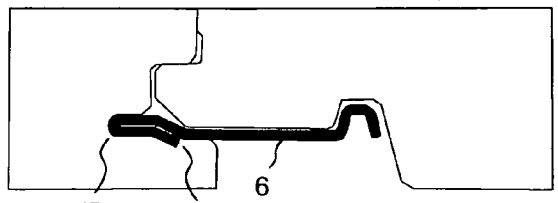
Fig.11f
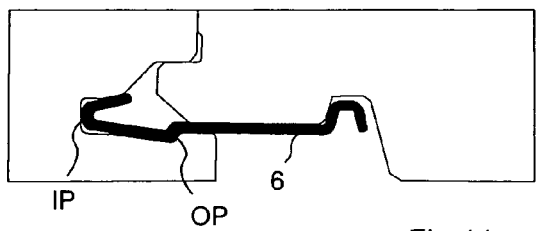
Fig.11b
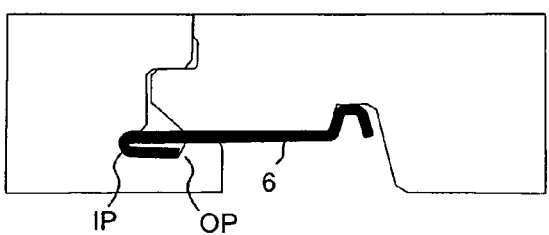
Fig.11g
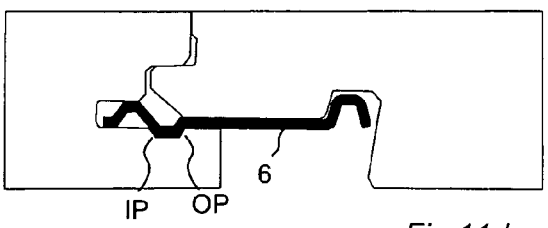
Fig.11c
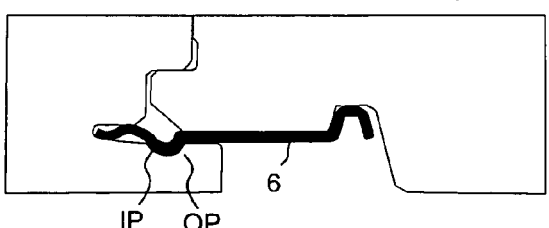
Fig.11h
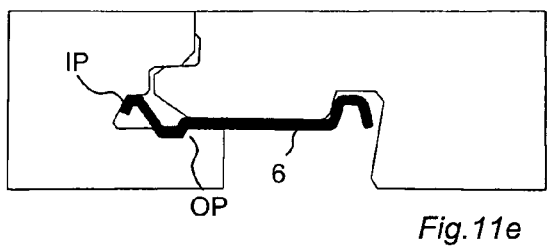
Fig.11d
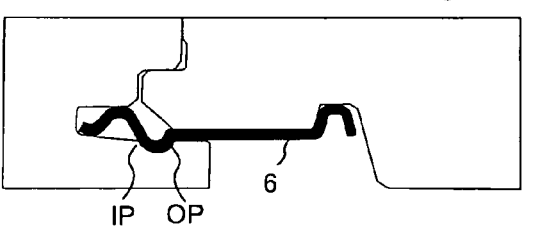
Fig.11i
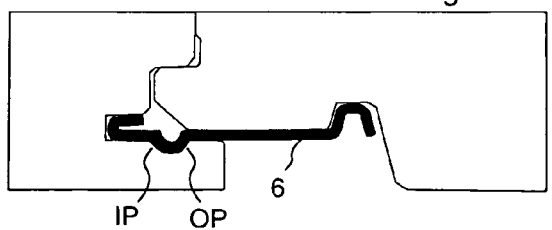
Fig.11e
Fig.11j

*Fig.14a*

| R1 | A | | A | | A | | A | | A | |
|---|---|---|---|---|---|---|---|---|---|---|
| R2 | | A | | A | | | | | | |
| R3 | A | | A | | | | | | | |
| R4 | | A | | | | | | | | |
| R5 | A | | | | | | | | | |

*Fig.14b*

| R1 | A | | A | | A | | A | | A | |
|---|---|---|---|---|---|---|---|---|---|---|
| R2 | | A | | A | | A | | A | | |
| R3 | A | | A | | A | | A | | A | |
| R4 | | A | | A | | A | | A | | |
| R5 | A | | A | | A | | A | | A | |

*Fig.14c*

| R1 | A | | A | | A | | A | | A | |
|---|---|---|---|---|---|---|---|---|---|---|
| R2 | | A | | A | | A | | A | | |
| R3 | A | | A | | A | | A | | A | |
| R4 | | A | | A | | A | | A | | |
| R5 | A | | A | | A | | A | | A | |
| | | | B | | B | | B | | | |
| | | | | B | | B | | B | | |
| | | | | | B | | B | | | |
| | | | | | | B | | B | | |
| | | | | | | | B | | | |

*Fig.14d*

| R1 | A | | A | | A | | A | | A | |
|---|---|---|---|---|---|---|---|---|---|---|
| R2 | | A | | A | | A | | A | | |
| R3 | A | | A | | A | | A | | A | |
| R4 | | A | | A | | A | | A | | |
| R5 | A | | A | | A | | A | | A | |
| R6 | | B | | B | | B | | B | | |
| R7 | B | | B | | B | | B | | B | |
| R8 | | B | | B | | B | | B | | |
| R9 | B | | B | | B | | B | | B | |
| R10 | | B | | B | | B | | B | | |

FLOORING AND METHOD FOR INSTALLATION AND MANUFACTURING THEREOF

CROSS REFERENCE TO RELATED APPLICATIONS

The present application is a continuation-in-part of PCT Application No PCT/SE04/00327 filed on Mar. 8, 2004, and claims the benefit of U.S. Application No. 60/456,956 filed on Mar. 25, 2003. The contents of PCT/SE04/00327 and U.S. 60/456,956 are incorporated herein by reference. This application also claims the priority of Swedish Application No. 0300626-9 filed on Mar. 6, 2003 and Swedish Application No. 0302865-1 filed on Oct. 29, 2003, the contents of which are incorporated herein by reference.

TECHNICAL FIELD

The application relates generally to the technical field of locking systems for floorboards. The application concerns on the one hand a locking system for floorboards which can be joined mechanically in different patterns and, on the other hand, floorboards provided with such a locking system, as well as methods of installation. More specifically, the application relates above all to locking systems which enable laying of mainly floating floors in advanced patterns.

FIELD OF APPLICATION

The present embodiments are particularly suited for use in floating wooden floors and laminate floors, such as massive wooden floors, parquet floors, laminate floors with a surface layer of high-pressure laminate or direct laminate. Laminate floors have a surface consisting of melamine impregnated paper which is compressed under pressure and heat.

DEFINITION OF SOME TERMS

In the following text, the visible surface of the installed floorboard is called "front side", while the opposite side of the floorboard facing the subfloor is called "rear side". "Horizontal plane" relates to a plane which is extended parallel to the outer part of the surface layer. Directly adjoining upper parts of two neighboring joint edges of two joined floorboards together define a "vertical plane" perpendicular to the horizontal plane.

The outer parts of the floorboard at the edge of the floorboard between the front side and the rear side are called "joint edge". As a rule, the joint edge has several "joint surfaces" which can be vertical, horizontal, angled, rounded, beveled etc. These joint surfaces exist on different materials, for instance laminate, fiberboard, wood, plastic, metal (in particular aluminum) or sealing materials. "Joint edge portion" relates to the joint edge of the floorboard and a part of the floorboard portions close to the joint edge.

By "joint", "joint system" or "locking system" are meant cooperating connectors which interconnect the floorboards vertically and or horizontally. By "mechanical joint system" is meant that joining can take place without glue. Mechanical joint systems can in many cases also be joined by glue. By "vertical locking" is meant locking parallel to the vertical plane and by "horizontal locking" is meant locking parallel to the horizontal plane. By "groove side" is meant the side of the floorboard in which part of the horizontal locking consists of a locking groove whose opening faces to the rear side. By "locking side" is meant the side of the floorboard in which part of the horizontal locking consists of a locking element which cooperates with the locking groove. By "locking angle" is meant the angle of the locking surfaces relative to the horizontal plane. In the cases where the locking surfaces are curved, the locking angle is the tangent to the curve with the highest angle.

DESCRIPTION OF RELATED ART

The following description of prior-art techniques, problems of known systems as well as the objects and features of embodiments of the invention will therefore, as non-limiting examples, be aimed mainly at the above referenced field of application. However, it should be emphasized that the embodiments disclosed herein can be used in any floorboards which are intended to be joined in different patterns by means of a mechanical joint system and, therefore, may thus also be applicable to floors with a surface of plastic, linoleum, cork, needle felt, varnished fiberboard surface and the like.

Traditional laminate and parquet floors are usually installed floating, i.e., without gluing, on an existing subfloor which does not have to be perfectly smooth or flat. Floating floors of this kind are usually joined by means of glued tongue and groove joints (i.e., joints with a tongue on one floorboard and a tongue groove on an adjoining floorboard) on the long side and the short side. In laying, the boards are brought together horizontally, a projecting tongue along the joint edge of one board being inserted into a tongue groove along the joint edge of an adjoining board. The same method is used on long side as well as on short side, and the boards are usually laid in parallel rows long side against long side and short side against short side.

In addition to such traditional floors which are joined by means of glued tongue/tongue groove joints, floorboards have been developed in recent years, which do not require the use of glue but which are instead joined mechanically by means of so-called mechanical joint systems. These systems comprise locking means which lock the boards horizontally and vertically. The mechanical joint systems can be formed by machining the core of the board. Alternatively, parts of the locking system can be made of a separate material which is integrated with the floorboard, i.e., already joined with the floorboard in connection with the manufacture thereof at the factory. The floorboards are joined, i.e., interconnected or locked together, by various combinations of angling, snapping-in and insertion along the joint edge in the locked position.

The principal advantages of floating floors with mechanical joint systems are that they can be laid quickly and easily by different combinations of inward angling and snapping-in. They can also be easily taken up again and be reused in some other place.

All currently existing mechanical joint systems and also floors intended to be joined by gluing have vertical locking means which lock the floorboards across the surface plane of the boards. The vertical locking means consist of a tongue which enters a groove in an adjoining floorboard. The boards thus cannot be joined groove against groove or tongue against tongue. Also the horizontal locking system as a rule consists of a locking element on one side which cooperates with a locking groove in the other side. Thus, the boards cannot be joined locking element against locking element or locking groove against locking groove. This means that the laying is in practice restricted to parallel rows. Using this technique, it is thus not possible to lay traditional parquet patterns where the boards are joined long side against short side in a "herringbone pattern" or in different forms of diamond patterns. It is known that floorboards can be made in formats which correspond to traditional parquet blocks and in A and B designs with mirror-inverted joint systems and that such floorboards can be joined mechanically in a herringbone pattern (WO 03/025307 owner Välinge Aluminium AB/Välinge Innovation AB) by various combinations of angling and snapping-in. Such floorboards can also, if the joint systems are designed in a suitable way, be joined in parallel rows. This is advantageous since a plurality of patterns can then be provided with the same type of floorboards.

An installation of floorboards, for example by angling of long sides and snapping of short sides, is time consuming especially when the floor consists of many small floorboards.

It would be an advantage if floorboards could be installed quickly and easily, especially in herringbone pattern but also in other patterns, with only an angling of the long sides. Such a simple laying method should be combined with joint systems having sufficient horizontal strength in the short sides when installed in parallel rows especially when the floorboards are narrow, for instance 60-120 mm, and when the small short side handles the same high shrinking forces as larger panels.

Narrow and small floorboards usually also take longer to be installed in parallel rows than traditional floorboards. It would be advantageous if the installation time could be reduced by simpler joining and less movement in connection with laying of the different parallel rows. There is thus a great need to improve the locking system and the laying methods when installing especially narrow floorboards which are laid by merely inward angling in a herringbone pattern as well as in parallel rows.

SUMMARY

The present embodiments relate to joint systems, floorboards, floors and methods of installation which make it possible to install floating floors more quickly, more easily and with greater strength than is known today in advanced patterns long side against short side and in parallel rows by merely an angular motion towards the subfloor. Also disassembly can take place quickly and easily by a reverse method.

The terms long side and short side are used to facilitate understanding. The boards can also be square or alternately square and rectangular and optionally also exhibit different patterns or other decorative features in different directions.

A first object of some of the disclosed embodiments is to provide floorboards, joint systems, methods of installation, and methods of disassembly, which make it possible to provide a floor which consists of rectangular floorboards joined mechanically in advanced patterns long side against short side and which can be disassembled and reused. The floorboards and the locking system are characterized in that joining and disassembly can take place merely by inward angling along the long sides of the boards. The angling method is considerably simpler than snapping-in, and a locking system which is locked by inward angling can be made stronger than a locking system which is locked by snapping-in. A special object is to provide such floors with a surface layer of high-pressure laminate or direct laminate.

A second object of some of the disclosed embodiments is to provide rectangular floorboards and locking systems which satisfy at least some of the above requirements and which are characterized in that the horizontal locking systems of the long side and the short side consist of a tongue with a locking element which cooperates with a tongue groove and an undercut groove. Such locking systems can be made in one piece with the floorboard and with a geometry that reduces the waste of material.

A third object is to provide floorboards and locking systems in which the short sides have horizontal locking elements which differ from the locking elements of the long sides. Preferably, the short sides have horizontal locking systems with locking surfaces having a higher locking angle than the long sides. Joining of short side against short side in parallel rows can then take place with great strength.

A fourth object is to provide floorboards and locking systems which on the long sides and short sides have horizontal locking systems with locking surfaces which are essentially perpendicular to the horizontal plane and which allow great strength when joining long side against long side and short side against short side.

A fifth object is to provide different joint systems which are suitable for use in the above floorboards and which partly consist of separate materials which are joined to the floorboard.

A sixth object is to provide laying methods which reduce the time of laying especially in the cases where small and narrow floorboards are laid in parallel rows.

It should be particularly emphasized that the combinations of joint systems that exist in this description are only examples of suitable embodiments. All joint systems can be used separately in long sides and/or short sides as well as in different combinations on long sides and short sides. The joint systems having horizontal and vertical locking elements can be joined by angling and/or snapping-in. The geometries of the joint systems and the active horizontal and vertical locking elements can be made by machining the edges of the floorboard or by separate materials being formed or alternatively machined before or after joining to the joint edge portion of the floorboard.

According to a first aspect, some of the presently disclosed embodiments comprise a flooring system comprising rectangular floorboards which are mechanically lockable. In the flooring system, each individual floorboard along its long sides has a pair of opposing connectors for locking together said floorboard with similar, adjoining floorboards both vertically and horizontally and along its short sides has a pair of opposing connectors. Furthermore, the connectors of the floorboards are designed so as to allow locking-together of the long sides by angling along an upper joint edge. The floorings system is distinguished in that said pair of opposing connectors of said short sides are adapted for locking the floorboards only horizontally, the system comprises two different types of floorboard, and the connectors of one type of floorboard along one pair of opposite edge portions being arranged in a mirror-inverted manner relative to the corresponding connectors along the same pair of opposite edge portions of the other type of floorboard.

In one embodiment, the connectors of the floorboards are designed so as to allow locking-together of the long sides by angling along the upper joint edge and of the short sides by a substantially vertical motion, and wherein a first short side is lockable to a first long side vertically and horizontally, and a second short side is lockable to a second long side only horizontally by a substantially vertical motion, and the horizontal connectors on the short sides having cooperating locking surfaces which are formed differently from the cooperating locking surfaces of the horizontal connectors of the long sides.

By being designed differently is meant, for instance, differences with respect to:

a) angle, shape, extent of the contact surfaces and their vertical position in the joint system,
b) type of material, combinations of materials, impregnating with property changing chemicals,
c) designing of the parts of the joint system that affect the strength, compression and the relative position between the locking surfaces.

As an example of item c) above, it may be mentioned that different designs of the locking element, especially with respect to its horizontal extent, may have a considerable effect on the strength of the locking surface when subjected to tension load. Different plays or the non-existence of play between the locking surfaces may give the joint system different properties.

According to a second aspect, some of the presently disclosed embodiments provide methods for laying a floor with two types of floorboards A and B which have mirror-inverted joint systems.

In one embodiment, laying takes place in a herringbone pattern by locking together two long sides of at least two floorboards of the first type of floorboard by angling towards two similar floorboards of the same type, and locking together another floorboard of the second type of floorboard by inward angling towards a similar floorboard of the same type.

According to another embodiment, laying takes place in parallel rows by angling in such a manner that a first B board in a new row is joined to the last laid A board in a preceding row.

There is also provided a flooring system comprising rectangular floorboards with long sides which have pairs of opposing connectors which at least allow locking-together both horizontally and vertically by inward angling. This flooring system is distinguished in that the system comprises floorboards with a surface layer of laminate, said floorboards being joined in a herringbone pattern, and that joining and disconnecting is achievable by an angular motion.

Finally, there is provided a flooring system, which comprises rectangular floorboards joined in a herringbone pattern, with a surface layer of high pressure laminate or direct laminate, in which system the individual floorboards along their long sides have pairs of opposing mechanical connectors for locking together similar, adjoining floorboards both vertically and horizontally by inward angling. In this embodiment, the short sides have merely horizontal locking elements. Since the floorboards are narrow and the short sides are held together by the long sides, this is sufficient when the boards are installed in a herringbone pattern.

BRIEF DESCRIPTION OF THE DRAWINGS

FIGS. 1a-b show embodiments of floorboards.
FIGS. 3a-3d show joining in a herringbone pattern.
FIGS. 4a-4c show joining by downward angling.
FIGS. 5a-5g show joining in a herringbone pattern.
FIGS. 6a-6d show embodiments of joint systems.
FIGS. 7a-7d show embodiments of joint systems.
FIGS. 9a-9e show embodiments of joint systems.
FIGS. 10a-10d show machining of joint systems.
FIGS. 11a-11j show embodiments of joint systems.
FIGS. 14a-14d show joining in parallel rows.

DETAILED DESCRIPTION OF THE PREFERRED EMBODIMENTS

Figure 2A:
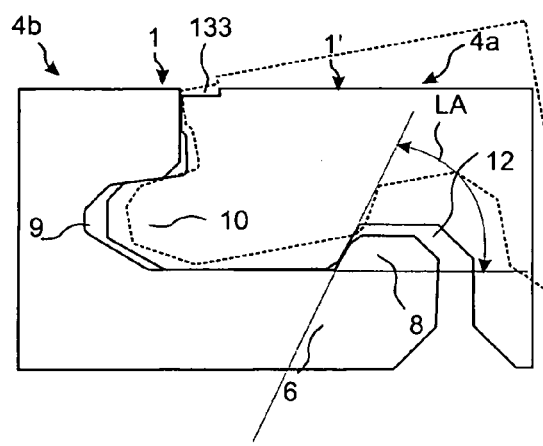
FIGS. 2a-2f show joint systems on long side and short side.

FIGS. 1a-b illustrate embodiments of floorboards which are of a first type A and a second type B and whose long sides 4a and 4b in this embodiment have a length which is 3 times the length of the short sides 5a, 5b. The long sides 4a, 4b of the floorboards have vertical and horizontal connectors, and the short sides 5a, 5b of the floorboards have horizontal connectors. In this embodiment, the two types are identical except that the location of the locking elements is mirror-inverted. The locking elements allow joining of long side 4a to long side 4b by at least inward angling and long side 4a to short side 5a by inward angling, and also short side 5b to long side 4b by a vertical motion. Joining of both long sides 4a, 4b and short sides 5a, 5b in a herringbone pattern can in this embodiment take place merely by an angular motion along the long sides 4a, 4b. The long sides 4a, 4b of the floorboards have connectors which in this embodiment consist of a strip 6, a groove 9 and a tongue 10. The short sides 5a also have a strip 6 and a tongue groove 9 whereas the short sides 5b have no tongue 10. There may be a plurality of variants. The two types of floorboards need not be of the same format and the locking elements can also have different shapes, provided that as stated above they can be joined long side against short side. The connectors can be made of the same material, or of different materials, or be made of the same material but with different material properties. For instance, the connectors can be made of plastic or metal. They can also be made of the same material as the floorboard, but be subjected to a treatment modifying their properties, such as impregnation or the like.

Figure 2B:
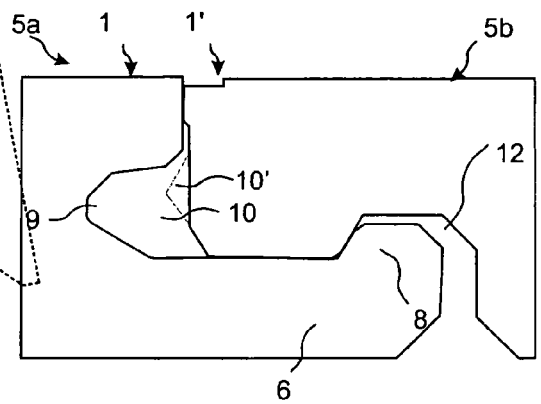
Figure 2C:
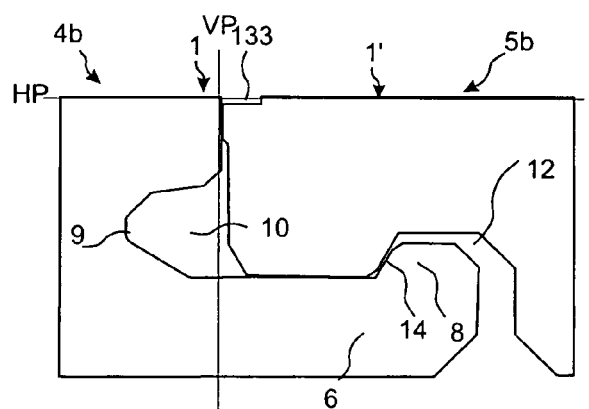

FIGS. 2a-2e show the connectors of two boards 1, 1' which are joined to each other. FIG. 2a shows long sides 4a and 4b. The vertical locking consists of a groove 9 which cooperates with a tongue 10. The horizontal locking consists of a strip 6 with a locking element 8 which cooperates with a locking groove 12. This locking system can be joined by inward angling along upper joint edges. This is indicated by the dashed part in FIGS. 2a and 2b. In FIG. 2c HP is the horizontal plane and VP the vertical plane. The locking element 8 and the locking groove 12 have cooperating locking surfaces which in FIG. 2a have a locking angle LA of about 60 degrees. The floorboard 1' has in the upper joint edge a decorative groove 133.

Figure 2D:
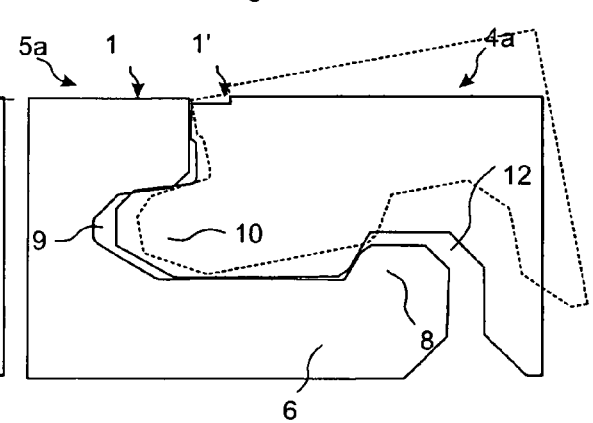
Figure 2E:
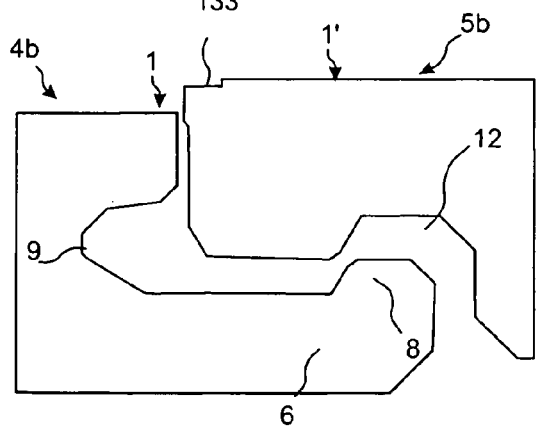
Figure 2F:
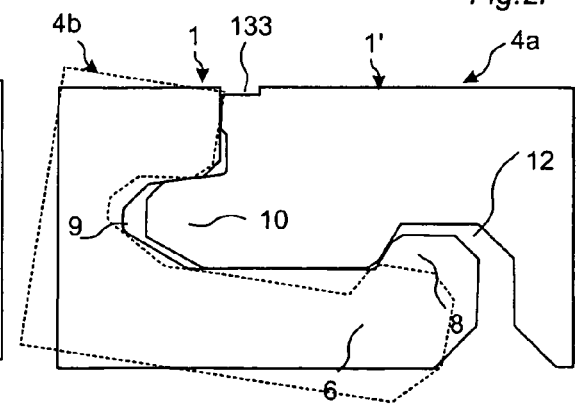

FIG. 2b shows the connectors on the short side. They consist of a strip 6 with a locking element 8 which cooperates with a locking groove 12 and provides horizontal locking of the floorboards 1, 1'. The short side 5a has a groove 9 which is adapted to cooperate with the tongue 10 of the long side 4a when long sides and short sides are locked to each other. However, the short side 5b has no tongue 10. FIGS. 2c, 2e show how the short sides 5b is locked to the long side 4b by a vertical motion. The joint system preferred in FIG. 2e can only be joined vertically by the short side 5b, called the groove side, being placed on a long side or short side that has a protruding strip 6, called the locking side. In this embodiment, locking cannot take place by the locking side being placed on the groove side. FIG. 2d shows how the short side 5a can be locked to the long side 4a vertically and horizontally using a joint system that allows inward angling. FIG. 2c shows that it may be an advantage if there is a play between the locking groove 12 and a locking surface 14 on the locking element 8. One preferred embodiment is characterized by the fact that when the panels 5b and 4b are pressed together, they may occupy a position with a play of for example 0.01-0.1 mm. Such a play will eliminate pretension, even in high humidity, and the panel 5b will not be forced upwards, as could be the case when the panels are connected with pretension and vertical displacement is not prevented by e.g. a tongue. The play could be combined with a decorative groove 133, which may be painted or impregnated with a color. Such a decorative groove 133 may contribute to make the play invisible even if the play is rather large, for example 0.1-0.2 mm.

FIGS. 3a-3e show installation of a floor in a herringbone pattern which can be provided by merely inward angling. The floorboards can also be disengaged from each other in reverse order by upward angling.

FIG. 3a shows how a type B floorboard is joined to a type A floorboard by angling long side 4a against short side 5a. Since the floorboard B2 has no tongue on the short side 5b, it can be angled down towards the floorboard A3. The numerals 1-3 indicate a suitable order of installation. The first row R1, seen transversely of the laying direction ID, can be joined by inward angling, insertion along the joint edge etc. according to FIG. 3b.

The next row, FIG. 3c, is joined by the A boards marked 6, 7 and 8 being joined by inward angling along the long sides. The boards 7 and 8 can be joined in this way since on the short side 5b they have no tongue of such a type as prevents downward angling of the short side against the long side. Finally, 3e shows how the floorboards 9 and 10 are laid by inward angling. The method of laying is thus characterized in that the entire floor can be laid in a herringbone pattern by inward angling. The laying long side against short side locks the boards alternately vertically and horizontally. With this laying method, all short sides will be locked both horizontally and vertically although they have no vertical locking elements in the form of a tongue for instance. Laying is characterized in that two boards of the same type, for instance board A6 and board A7, are preferably laid before the board B9 can be angled inwards. Within the scope of embodiments of the invention, the locking system according to FIG. 2b can also be provided with a vertical locking elements 10' which allows vertical motion with a snap-in effect, as outlined in FIG. 12b. However, this is of limited importance to the function of the floor and installation will be more difficult, but such a joint system can provide better strength on the short side when the boards are laid in parallel rows.

Floorboards that are adapted to be laid in a herringbone pattern can also, if the joint system is designed in a convenient manner, be joined in parallel rows. This is advantageous since more patterns can be provided with the same type of floorboards and this facilitates production and stock-keeping. FIGS. 4a and 4b show how a new floorboard A4 in a new row R2 is joined to a previously laid floorboard A2 in a preceding row R1 by an angular motion A along the long sides 4a and 4b. The short side of the new board A4 with the groove side 5b is folded down vertically over the short side of a previously laid board A3 and over its locking side 5a. When a subsequently laid board A5 in a subsequent row R3 is joined to the floorboards A3, A4, the long sides in the preceding row R1 and the subsequent row R3 will lock the short sides 5a and 5b and prevent the groove side 5b from being angled upwards. The short sides are then joined both vertically and horizontally. The boards can be detached in reverse order. The tongue groove 9 of the locking side 5a is in this laying method not active but is necessary to allow joining to the long side 4a. The tongue groove 9a thus is not necessary if joining should only take place in parallel rows. A locking angle of, for example, about 60 degrees is usually sufficient to provide great strength in the long sides. Such an angle facilitates inward angling. The corresponding angle on the short side can give insufficient strength, especially in narrow boards with a width of e.g., 60-120 mm. The long sides do not manage to keep the short sides together in the same plane when the locking angle is low. This may result in snapping out or undesirable joint gaps. A high locking angle on the short side gives no drawbacks when the boards are laid by a vertical motion towards the subfloor.

FIG. 5a shows a tongue lock in the form of a joint system which consists of a tongue 10 having a locking element 8 in its outer and upper part close to the floor surface in one joint edge of the floorboard 1. The joint system also has a tongue groove 9 with an upper lip 21 and a lower lip 22 as well as an undercut groove 12 in the other joint edge of the floorboard 1'. Such a joint system can be made compact and this reduces the waste of material since the tongue 10 is made by machining the joint edge of the floorboard. The waste of material is important since the floorboards are narrow and short. FIGS. 5b-5g show how such a joint system can be adjusted so that it can be joined by angling in a herringbone pattern and parallel rows. In this embodiment, the groove side 5b of the short side has no lower lip that prevents vertical locking. The long sides can be joined by angling according to FIG. 5e and the long sides can also be locked to the short sides by angling and vertical folding according to FIGS. 5c and 5f. It is obvious that the long sides can be angled with the locking side against the groove side and with the groove side against the locking side. The joint system can also be made of a separate material that is joined to the joint edge. If the floorboards are only intended to be laid in parallel rows, for instance, the long sides can be formed with a tongue lock according to FIG. 5a and the short sides with a strip lock according to FIG. 2a.

FIGS. 6a-6d show how the tongue lock can be modified so as to be easily joined by an angular motion long side against long side and long side against short side while at the same time having great strength when one short side is joined to another short side by an angular motion towards the floor. The locking element on the long side 4b and on the short side 5a in FIGS. 6a and 6b has a locking element with an upper locking surface 15 close to the surface of the floorboard, which has a lower locking angle LA 1 than a lower locking surface 14 with the locking angle LA 2. The groove side 4a of the long side is adapted to cooperate with the upper locking surface 15 which has the lower locking angle LA 1, and the groove side 5b of the short side is adapted to cooperate with the lower locking surface 14 which has the higher locking angle LA 2. FIGS. 6c and 6d show joining long side against short side. The low locking angle on the long side is an advantage in machining since the undercut groove 12 can then be made using large rotary tools. Higher locking angles can be made, for example, by scraping with a stationary tool against a joint edge in motion. The high locking angle in the groove 12 can easily be made since the lower lip 22 is missing.

FIGS. 7a-7d show how the strip lock, with a protruding strip 6 which supports a locking element 8, can be modified in the same way as the tongue lock so that a locking angle with locking short side 5a to short side 5b can take place with a higher locking angle than in the case when the long side is locked to the long side or the short side. The locking element on both long side and short side has an upper locking surface 15 which has a lower locking angle than a lower locking surface 14. The locking element 8 of the short side 5a has a longer extent horizontally than the short side. This improves the strength of the short side while at the same time the waste of material increases only marginally. All locking elements 8 which are preferred can in this manner be made greater on the short side, and the locking groove of the long side can be adjusted so that it can be joined to the locking element 8 of the short side.

Figure 8A:
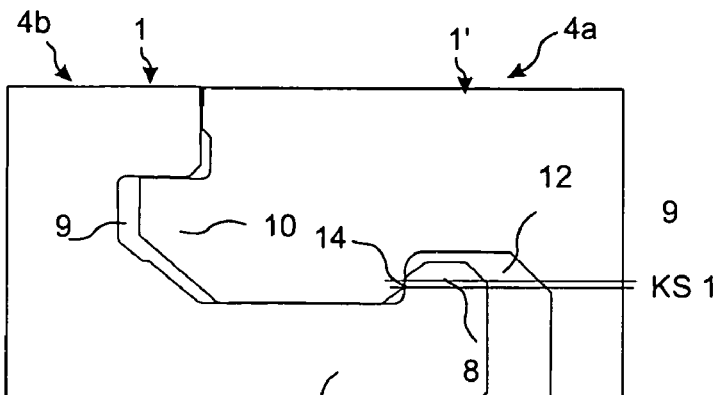
FIGS. 8a-8d show embodiments of joint systems.
Figure 8B:
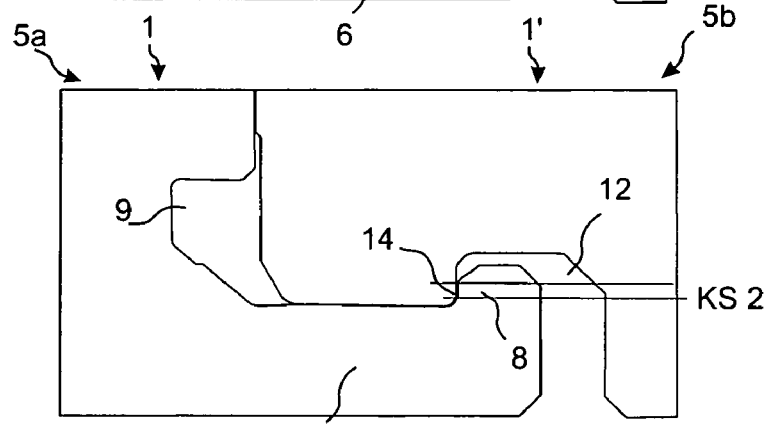
Figure 8C:
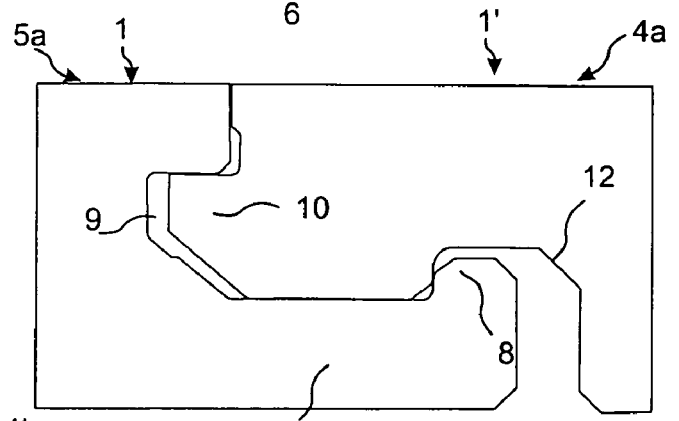
Figure 8D:
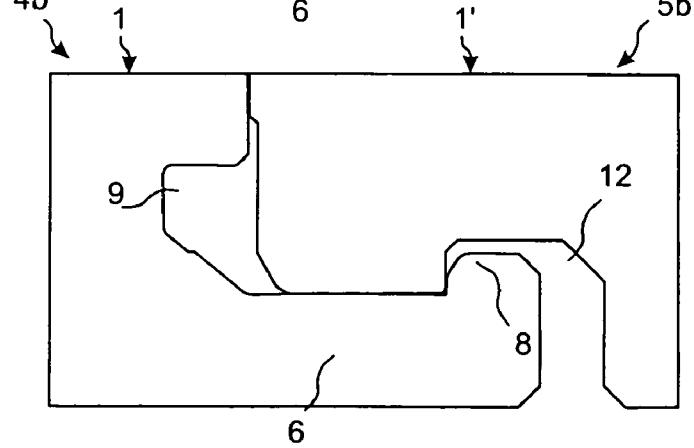

FIGS. 8a-8b show a strip lock with a locking element on long sides and short sides which has a locking surface 14 which is essentially perpendicular to the horizontal plane. The contact surface KS 1 between the locking element 8 and the locking groove 12 is on the long side greater than the contact surface KS 2 on the short side. As a non-limiting example, it may be mentioned that the contact surface KS 1 of the long side can give sufficient strength with a vertical extent which is only 0.1-0.3 mm. Material compression and strip bending allow inward angling and upward angling in spite of the high locking angle. Such a joint system on the long side can be combined with a joint system on the short side which has a high locking angle and a contact surface KS 2 of, for instance, 0.5-1.0 mm. A small play on the long side of for instance 0.01-0.10 mm, which arises between the locking surfaces when the boards are pressed together horizontally, additionally facilitates upward angling and makes manufacture easy. Such a play causes no visible joint gaps between the upper joint edges. The joint system can be made with locking angles exceeding 90 degrees. If this is done merely on the short sides, the boards can easily be released from each other by being pulled out parallel to the joint edge after the long sides have been, for instance, released by upward angling.

FIGS. 9a-9d show a strip lock which consists of a separate material, for example a fiberboard-based material such as HDF or the like. Such a joint system can be less expensive than one that is made in one piece with the floorboard. Moreover, strip materials can be used, that have other and better properties than the floorboard and that are specially adjusted to the function of the joint system. The strip 6 in FIG. 9a is factory-attached to the floorboard 1 mechanically by snapping-in in an upwardly angled position. This is shown in FIG. 9e. FIG. 9a shows that the strip and the joint edge portion of the floorboard have cooperating parts which with great accuracy lock the strip horizontally and vertically and prevent a vertical motion of the outer part 7 of the strip upwardly to the floor surface and downwardly to the rear side. The strip is positioned and locked to the floorboard horizontally and vertically by the tongue 10' of the strip cooperating with the tongue groove 9' of the floorboard, and by the locking element 8' of the floorboard cooperating the locking groove 12' of the strip. The portions Db1 and Db2 prevent downward bending of the outer part 7 of the strip in case of tension load, and the portions Ub1 and Ub2 prevent upward bending of the outer part 7 so that the strip does not come loose during handling before laying. The portions IP and UP position the strip in its inner and outer position relative to the vertical plane VP.

FIG. 9b shows an embodiment which is convenient for e.g., wooden floors. Upward bending is prevented by the portions Ub1 and Ub2 and also by the fact that the locking angle LA is higher than the tangent to the circular arc C1 with is center in the point of rotation Ub2. FIG. 9c shows an embodiment in which the strip 6 is located in a plane which is closer to the surface than the rear side of the floor. The strip 6 can then be made of a thinner board material than in the embodiments according to FIGS. 9a and 9b.

FIG. 9d shows how the short side can be formed. All these embodiments can be combined with the locking angles and joint geometries that have been described above. A number of combinations are feasible. The long side may have, for example, a joint system with a separate strip, and a short side may be formed in one piece according to, for example, some of the previously preferred embodiments.

FIGS. 10a-d show how the lower lip 22 can be formed by large rotary tools. The joint system according to FIGS. 10a and 10b uses two tools TP1A and TP1B which machine the joint edge portions at two different angles. RD indicates the direction of rotation. A corresponding part in the joint systems according to FIGS. 10c and 10d can be made using one tool only. In these two embodiments, the lower lip 22 projects from the vertical plane VP.

FIGS. 11a-11j show embodiments in which the strip 6 is made of a metal sheet, preferably aluminum. The design has been chosen so that the strip 6 can be formed by merely bending. This can be done with great accuracy and at low cost. Sufficient strength can be achieved with 0.4-0.6 mm metal sheet thickness. All embodiments allow inner (IP) and outer (OP) positioning and they also counteract the angular motion of the strip 6 upwards (Ub1, Ub2) and downwards (Db1 and Db2). The joint edge portions can also be manufactured rationally by large rotary tools.

Figure 12A:
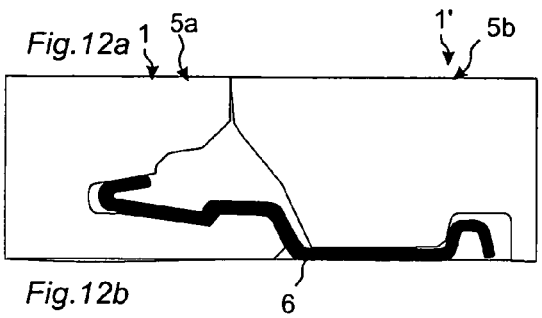
FIGS. 12a-12j show embodiments of joint systems.
Figure 12F:
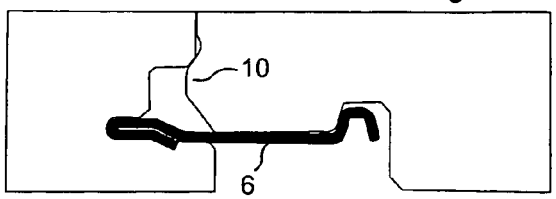
Figure 12B:
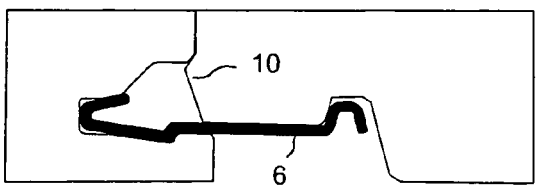
Figure 12G:
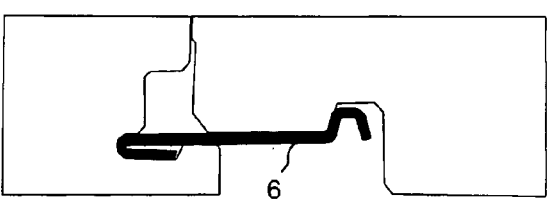
Figure 12C:
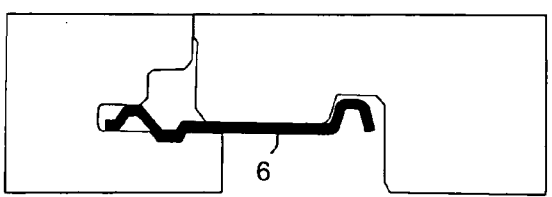
Figure 12H:
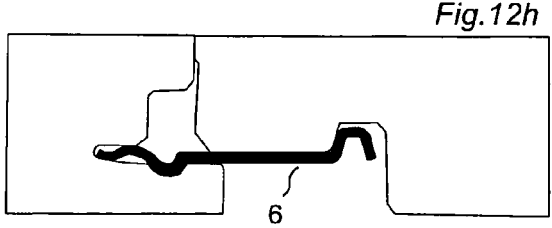
Figure 12D:
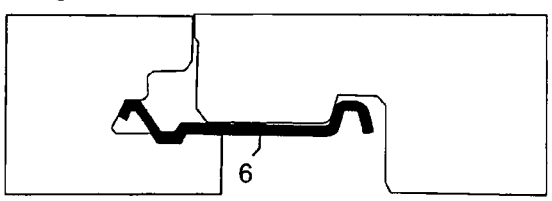
Figure 12I:
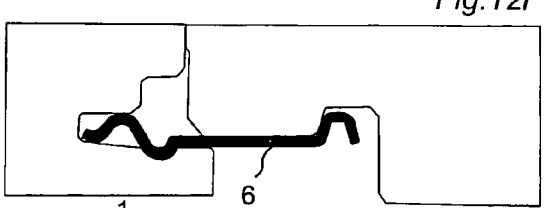
Figure 12E:
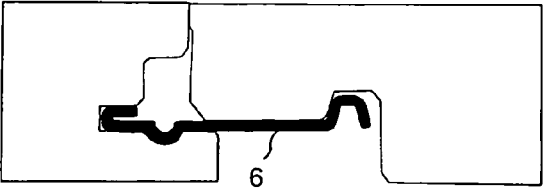
Figure 12J:
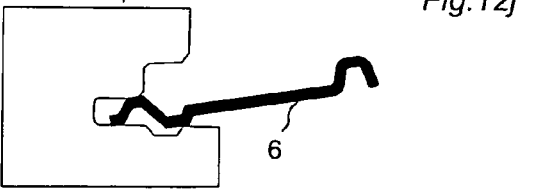

FIGS. 12a-12i show short sides. FIGS. 12b and 12f show that the joint system can also be made with vertical locking in the form of a small tongue 10. This allows locking with vertical snapping-in. FIG. 12j shows how the strip is factory-attached by snapping-in in an upwardly angled position. It is obvious that separate strips can be supplied so that they are attached to the floorboard in connection with installation. This can take place manually or by means of tools, see FIG. 9e, which are formed so that the floorboard and the strip, for instance, are moved past pressing rollers PR which by a combination of snapping and angling attach the strip 6. A strip of, for example, aluminum sheet which is formed by merely bending and which is attached to the joint edge of the floorboard by snapping-in is less expensive and easier to manufacture than other known alternatives.

The floorboards can on one side, for instance the long side, have one type of joint system formed according to a preferred embodiment and made in one piece, of fiberboard-based material or of metal. The other side may have another type. It is also obvious that many variants can be provided by changing angles, radii and dimensions. Strips can also be made by extrusion of metals, plastics and various combinations of materials. The joint systems can also be used to join other products, for instance wall panels and ceilings, but also components for furniture. Mechanical joint systems that are used in floors can also be used for mounting, for instance, kitchen cupboards on walls.

Figure 13A:
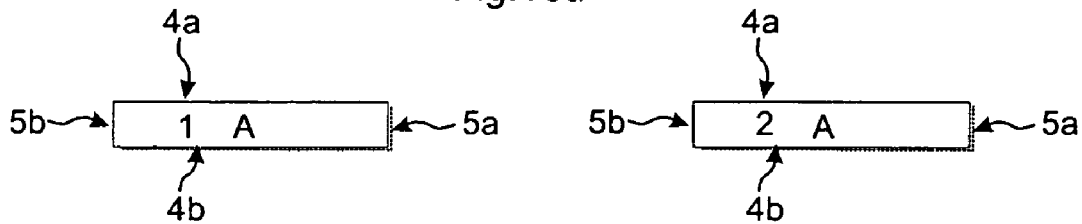
FIGS. 13a-13f show joining in parallel rows.
Figure 13B:
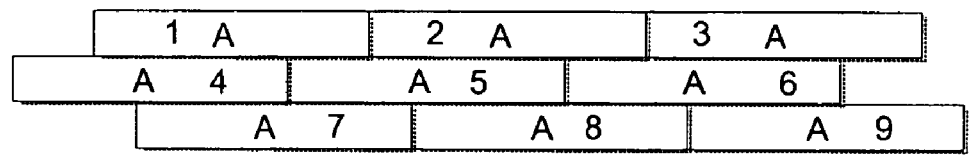

FIGS. 13a-f show laying methods for joining of floors. FIG. 13a shows floorboards of a type A having a locking side 5a and a groove side 5b. Since the groove side is to be folded down on the locking side, it is convenient to install the floor so that installation of all rows is made from the same side. Generally, the floor-layer moves many times. This may take a considerable time when large surfaces are installed. The order of installation is A1, A2 . . . A9.

Figure 13C:
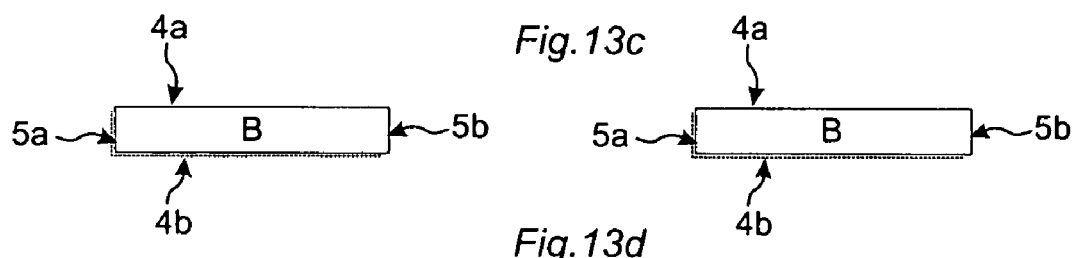
Figure 13D:
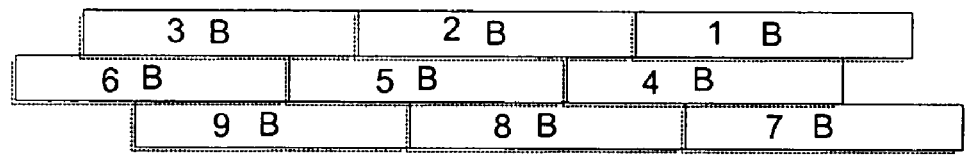

FIGS. 13c and d show that B boards should be installed from the opposite direction since their locking systems on the short side are mirror-inverted relative to the A boards.

Figure 13E:
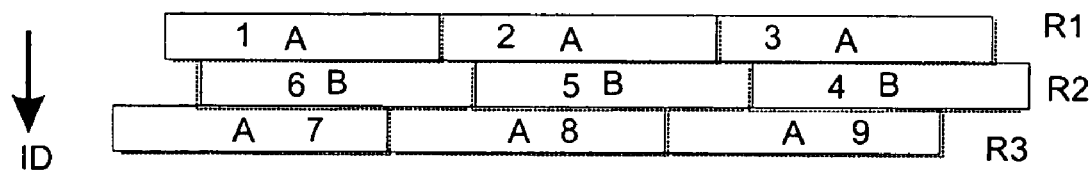

FIG. 13e shows that installation can take place alternately from left to right if A and B boards are used. This reduces the time of laying.

Figure 13F:
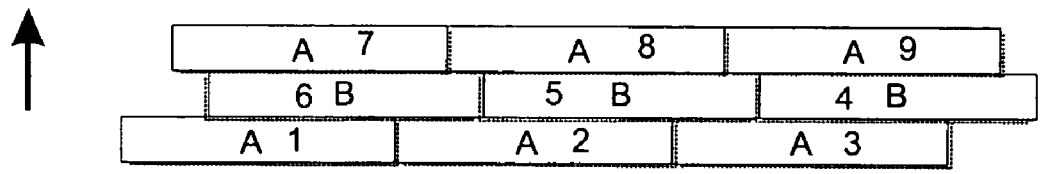

FIG. 13f shows that installation can also be made backwards in the direction of installation ID.

FIGS. 14a-d show a rational installation in parallel rows using A and B boards with mirror-inverted joint systems. According to FIG. 14a, for instance the rows R1-R5 with A boards are first installed. Then a movement takes place and the remaining A boards are installed according to FIG. 14b. In the next step, B boards are installed, after which a movement takes place and the remaining B boards can be installed. Installation of these ten rows can thus take place with only two movements. The method in this example is characterized by a first B board in a new row R6 being joined to the last laid A board in a preceding row R5. Thus, some embodiments of the present invention comprise also a floor which consists of two types of boards A and B with mirror-inverted joint systems which are joined in parallel rows.

Installation according to the above-preferred method can also be made by angling and snapping-in and with only one type of floorboards if they have short sides that can be joined in both directions parallel to the long sides.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A flooring system comprising rectangular floorboards which are mechanically lockable,
   in which system the individual floorboards along their long sides have pairs of opposing connectors for locking together similar, adjoining floorboards both vertically and horizontally and along their short sides have pairs of opposing connectors which lock the floorboards horizontally,
   wherein the connectors of the floorboards are designed to allow locking-together of the long sides by angling along an upper joint edge,
   wherein the system comprises two different types of floorboards, the connectors of one type of the floorboards along one pair of opposite edge portions arranged in a mirror-inverted manner relative to the corresponding connectors along the same pair of opposite edge portions of the other type of floorboards,
   wherein said pair of opposing connectors of said short sides are adapted for locking the floorboards only horizontally,
   wherein the mirror inverted panels are connected to each other
   wherein a short side is lockable to a long side.

2. The flooring system as claimed in claim 1, wherein the connectors of the floorboards on the short sides are designed so as to allow horizontal locking by an essentially vertical motion.

3. The flooring system as claimed in claim 2, wherein the floorboards are disconnectable by an angular motion away from a subfloor.

4. The flooring system as claimed in claim 1, wherein the floorboards are disconnectable by an angular motion away from a subfloor.

5. A flooring system comprising rectangular floorboards which are mechanically lockable,
   in which system the individual floorboards along their long sides have pairs of opposing connectors for locking together similar, adjoining floorboards both vertically and horizontally and along their short sides have pairs of opposing connectors which lock the floorboards horizontally,
   wherein the connectors of the floorboards are designed to allow locking-together of the long sides by angling along an upper joint edge,
   wherein the system comprises two different types of floorboards, the connectors of one type of the floorboards along one pair of opposite edge portions arranged in a mirror-inverted manner relative to the corresponding connectors along the same pair of opposite edge portions of the other type of floorboards, and
   wherein said pair of opposing connectors of said short sides are adapted for locking the floorboards only horizontally,
   wherein the connectors of the floorboards are designed to allow locking-together of the long sides by angling along the upper joint edge and of the short sides by a substantially vertical motion, and
   wherein a first short side is lockable to a first long side vertically and horizontally, and a second short side is lockable to a second long side only horizontally by a substantially vertical motion, and
   wherein the horizontal connectors on the first and second short sides have cooperating locking surfaces which are formed differently from the cooperating locking surfaces of the horizontal connectors of the first and second long sides.

6. The flooring system as claimed in claim 5, wherein the cooperating locking surfaces of the first and second short sides have a first locking angle to a front side of the floorboard, and the cooperating locking surfaces of the first and second long sides have a second locking angle to the front side of the board, and the first locking angle is higher than the second locking angle.

7. The flooring system as claimed in claim 6, wherein parts of the horizontal connectors include a separate fiberboard-based strip mechanically joined to the floorboard.

8. The flooring system as claimed in claim 6, wherein parts of the horizontal connectors include a separate strip of aluminum sheet which is formed by bending and which is mechanically joined to the floorboard.

9. The flooring system as claimed in claim 5, wherein the cooperating locking surfaces of the floorboards on the first and second long sides and the first and second short sides have a locking angle which is essentially perpendicular to the surface of the floorboards, and that the cooperating locking surfaces of the first and second short sides have a higher vertical extent than do the cooperating locking surfaces of the first and second long sides.

10. The flooring system as claimed in claim 5, wherein parts of the horizontal connectors include a separate fiberboard-based strip mechanically joined to the floorboard.

11. The flooring system as claimed in claim 5, wherein parts of the horizontal connectors include a separate strip of aluminum sheet which is formed by bending and which is mechanically joined to the floorboard.

12. A method for manufacturing a floor of rectangular, mechanically locked floorboards,
    which along their long sides have pairs of opposing connectors for locking together similar, adjoining floorboards both vertically and horizontally and along their short sides have pairs of opposing connectors,
    wherein the connectors of the floorboards on the long sides are designed so as to allow locking-together by an angular motion along an upper joint edge, and
    wherein the connectors of the floorboards on the short sides are designed so as to allow locking-together by an essentially vertical motion,
    said floorboards comprising a first and a second type of floorboard, which differ from each other by the connectors of the first type of floorboard along one pair of opposite edge portions being arranged in a mirror-inverted manner relative to the corresponding connectors along the same pair of opposite edge portions of the second type of floorboard, the method comprising:

forming a first row of floorboards by:
   joining a first short side of a second floorboard of the first type to a short side of a first floorboard of the first type, and then
   joining a short side of a third floorboard of the first type to a second short side of the second floorboard of the first type, wherein the third floorboard is the last laid floorboard in the first row, and then
forming a second row of floorboards by:
   joining a long side of floorboard of the second type in the second row directly to the last laid floorboard of the first type in the first row.

13. The method as claimed in claim 12, wherein the floorboards are laid in parallel rows.

14. The method as claimed in claim 12, wherein the horizontal connectors on the short sides have cooperating locking surfaces which are designed differently from the cooperating locking surfaces on the long sides.

15. The method as claimed in claim 14, wherein the floorboards are laid in parallel rows.

16. A flooring system comprising rectangular floorboards which are mechanically lockable,
   in which system the individual floorboards along their long sides have pairs of opposing connectors for locking together similar, adjoining floorboards both vertically and horizontally and along their short sides have pairs of opposing connectors which lock the floorboards horizontally,
   wherein the connectors of the floorboards are designed to allow locking-together of the long sides by angling along an upper joint edge,
   wherein the system comprises two different types of floorboards, the connectors of one type of the floorboards along one pair of opposite edge portions arranged in a mirror-inverted manner relative to the corresponding connectors along the same pair of opposite edge portions of the other type of floorboards, wherein the connectors of the floorboards on the short sides are designed so as to allow locking-together by an essentially vertical motion,
   wherein the mirror inverted panels are connected to each other
   wherein a short side is lockable to a long side.

17. A method for making a flooring of rectangular, mechanically locked floorboards,
   which along their long sides have pairs of opposing connectors for locking together similar, adjoining floorboards both vertically and horizontally and along their short sides have pairs of opposing connectors which allow locking-together of similar, adjoining floorboards only horizontally,
   wherein the connectors of the floorboards on the long sides are designed so as to allow locking-together by an angular motion along an upper joint edge, said floorboards comprising a first and a second type of floorboard, which differ from each other by the connectors of a first type of floorboard along one pair of opposite edge portions being arranged in a mirror-inverted manner relative to the corresponding connectors along the same pair of opposite edge portions of a second type of floorboard, the method comprising:
forming a second row of floorboards by:
   locking together two long sides of at least two floorboards of the first type of floorboard in the second row by angling towards two similar floorboards of the same type in a first row; and
forming a third row of floorboards by:
   locking together a long side of a floorboard of the second type of floorboard with a long side of a floorboard of the first type of floorboard in the second row by inward angling, and
forming a fourth row of floorboards by:
   locking together a long side of a floorboard of the second type of floorboard with a long side of a floorboard of the second type of floorboard in the third row by inward angling.

18. A flooring system comprising:
   rectangular floorboards with long sides which have pairs of opposing connectors which at least allow locking-together both horizontally and vertically by inward angling, and short sides having pairs of opposing connectors which lock the floorboard horizontally,
   wherein the system comprises floorboards with a surface layer of laminate, said floorboards being joined in a herringbone pattern, and that joining and disconnecting is achievable by an angular motion,
   said pair of opposing connectors of said short sides are adapted for locking the floorboards only horizontally,
   wherein the mirror inverted panels are connected to each other, and
   wherein a short side is lockable to a long side.

19. The method as claimed in claim 12, wherein the connectors of the floorboards on the short sides are adapted for locking the floorboards only horizontally.

20. A flooring system comprising rectangular floorboards which are mechanically lockable,
   in which system the individual floorboards along their long sides have pairs of opposing connectors for locking together similar, adjoining floorboards both vertically and horizontally and along their short sides have pairs of opposing connectors which lock the floorboards horizontally,
   wherein the connectors of the floorboards are designed to allow locking-together of the long sides by angling along an upper joint edge,
   wherein the system comprises two different types of floorboards, the connectors of one type of the floorboards along one pair of opposite edge portions arranged in a mirror-inverted manner relative to the corresponding connectors along the same pair of opposite edge portions of the other type of floorboards,
   wherein said pair of opposing connectors of said short sides are adapted for locking the floorboards only horizontally,
   wherein the mirror inverted panels are connected to each other.

* * * * *